(12) United States Patent
Kashyap et al.

(10) Patent No.: US 9,397,352 B2
(45) Date of Patent: Jul. 19, 2016

(54) FUEL CELL MOTOR

(71) Applicants: Ravindra L. Kashyap, Bronx, NY (US);
Govind L. Sahu, Brooklyn, NY (US)

(72) Inventors: Ravindra L. Kashyap, Bronx, NY (US);
Govind L. Sahu, Brooklyn, NY (US)

( * ) Notice: Subject to any disclaimer, the term of this patent is extended or adjusted under 35 U.S.C. 154(b) by 0 days.

(21) Appl. No.: 14/827,411

(22) Filed: Aug. 17, 2015

(65) Prior Publication Data
US 2015/0357658 A1 Dec. 10, 2015

Related U.S. Application Data

(62) Division of application No. 12/817,772, filed on Jun. 17, 2010, now Pat. No. 9,112,197.

(60) Provisional application No. 61/187,820, filed on Jun. 17, 2009.

(51) Int. Cl.
*H01M 8/04* (2016.01)
*H01M 8/24* (2016.01)
*H01M 8/02* (2016.01)
*H02K 99/00* (2014.01)
(Continued)

(52) U.S. Cl.
CPC .......... *H01M 8/04201* (2013.01); *H01M 8/004* (2013.01); *H01M 8/0247* (2013.01); *H01M 8/04007* (2013.01); *H01M 8/04089* (2013.01); *H01M 8/04104* (2013.01); *H01M 8/04291* (2013.01); *H01M 8/04753* (2013.01); *H01M 8/24* (2013.01); *H01M 8/242* (2013.01); *H01M 8/249* (2013.01); *H01M 8/2475* (2013.01); *H02J 7/02* (2013.01); *H02K 57/006* (2013.01); *H01M 8/04097* (2013.01); *H01M 8/04223* (2013.01); *H01M 2008/1095* (2013.01); *H01M* 2250/20 (2013.01); *Y02E 60/50* (2013.01); *Y02E 60/523* (2013.01); *Y02P 70/56* (2015.11); *Y02T 90/32* (2013.01)

(58) Field of Classification Search
CPC ................. H01M 2008/1095; H01M 2250/20; H01M 8/0247; H01M 8/04007; H01M 8/04089; H01M 8/04097; H01M 8/04223; H01M 8/04291; H01M 8/04753; H01M 8/249; H01M 8/004; H01M 8/04104; H01M 8/04201; H01M 8/24; H01M 8/242
USPC ............ 429/400, 403, 505; 310/67 R, 53, 54, 310/112, 114, 185, 266
See application file for complete search history.

(56) References Cited

U.S. PATENT DOCUMENTS 5,316,643 A   5/1994  Ahn et al.
5,830,593 A  11/1998  Nielson
(Continued)

*Primary Examiner* — Milton I Cano
*Assistant Examiner* — Ling R Zeng
(74) *Attorney, Agent, or Firm* — Carter, DeLuca, Farrell & Schmidt, LLP

(57) ABSTRACT

A Fuel Cell Motor, or, Fuel Cell Engine, and system are described. A central output shaft is mounted with a novel set of rotationally capable fuel cells, of various shapes and configurations. These fuel cells when supplied by hydrogen and oxygen fuels generate electricity. That electricity so generated is channeled to electromagnet winding poles that are mounted on top of these rotationally capable fuel cells and also to the nearby stator electromagnetic poles. The current in the armature electromagnet poles produces magnetic fields which interacts with the congruent magnetic fields produced by the stator electromagnetic winding poles, to cause a rotational motion on the armature poles, adjoined to the central output shaft; henceforth, accomplishing the operations of an electric motor.

19 Claims, 27 Drawing Sheets

(51) Int. Cl.
*H01M 8/00* (2016.01)
*H02J 7/02* (2016.01)
*H01M 8/10* (2016.01)

(56) References Cited

U.S. PATENT DOCUMENTS

| | | | |
|---|---|---|---|
| 5,923,106 A * | 7/1999 | Isaak | H02K 11/0094 310/1 |
| 5,979,507 A | 11/1999 | Kojima et al. | |
| 6,005,322 A | 12/1999 | Isaak et al. | |
| 6,379,828 B1 | 4/2002 | Worth | |
| 6,580,191 B2 | 6/2003 | Lennox | |
| 6,720,102 B2 * | 4/2004 | Edwards | H01M 8/04014 429/444 |
| 7,066,854 B2 | 6/2006 | Duan | |
| 7,208,239 B2 | 4/2007 | Hoffjann et al. | |
| 7,592,727 B1 | 9/2009 | Doughty | |
| 9,112,197 B1 | 8/2015 | Kashyap et al. | |
| 2002/0177020 A1 * | 11/2002 | Iio | H01M 8/04022 429/422 |
| 2007/0141409 A1 | 6/2007 | Cho et al. | |
| 2009/0183936 A1 | 7/2009 | Kim et al. | |
| 2009/0220833 A1 * | 9/2009 | Jones | H01M 8/0247 429/468 |
| 2010/0015503 A1 | 1/2010 | Yaguchi et al. | |

* cited by examiner

FUEL CELL MOTOR

PRIORITY

The present application claims priority to a U.S. Utility patent application filed on Jun. 17, 2010 and assigned U.S. patent application Ser. No. 12/817,772 which claims priority to a U.S. provisional application filed on Jun. 17, 2009 and assigned U.S. Provisional Application Ser. No. 61/187,820; the entire contents of the provisional application are incorporated herein by reference.

SUMMARY

Since the future of engine and motor technologies are possibly going to be based on hydrogen fuel cell technologies, herein, is described a Fuel Cell Motor and system that adds greater efficiency to the operation of motors and engines using fuel cells.

The present disclosure is directed to a motor made form a rotationally capable fuel cells element resting on a central output shaft, that, these said fuel cells generates electricity by the supply of hydrogen and oxygen; and, that, electricity is channeled to an electromagnetic winding armature pole, mounted on top of or beside these said fuel cells, and the same current goes to the stator electromagnetic poles, as well. The rotational fuel cells, and the adjoining armatures poles are all attached to the same central axle output shaft of the fuel cell motor. The stator poles stay stationary and remain in close proximity but outside the rotational armature electromagnet pole and fuel cell arrangement. When hydrogen and oxygen is supplied to the, rotational fuel cell, the electricity generated yields a mechanical torque onto the central output shaft by the electromagnetic interaction between the armature and stator electromagnetic poles. Henceforth, accomplishes the motor functionality of this novel device.

The significant advantage of this kind of motor/engine device is that it allows for the highly efficient reaction of hydrogen and oxygen moieties (or any other reactants) to take place inside a rotating fuel cell system, at lower pressure and temperature conditions, as compared to regular fuel cell apparatus. Intuitively, the efficient reaction of hydrogen and oxygen molecules happens because the fuel cell rotation perturbs and agitates the reactant gas molecules with the catalyst, henceforth, augmenting reaction process and increasing electric current production which in turn yields a greater torque generation onto the central axle output shaft of the fuel cell motor device. So, this device allows for a greater efficiency in the use of fuel cell technology to run motors for a plethora of applications.

Another main advantage of the motor is that tremendous amount of space is saved allowing in the development of a compact motor system, when, compared to a combination of the fuel cell battery attached to a separate motor system. And less catalytic materials (like platinum) are required to run the fuel cell reaction process in this embodiment of the rotating Fuel Cell Motor, lending to cost effectiveness of this design.

DETAILED DESCRIPTION

Figure 1:
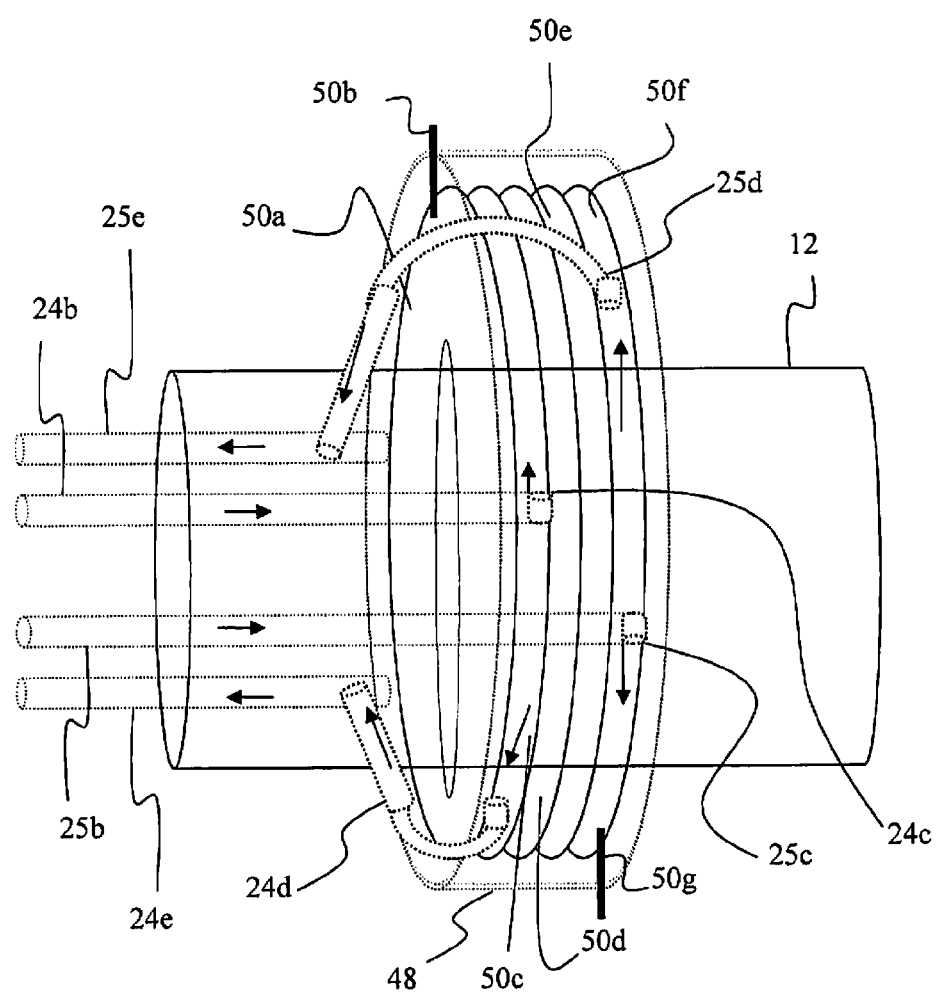
FIG. 1 An encased discoid shaped fuel cell mounted onto the central axle output shaft. Included are the bored tubular holes or conduits inside the central output shaft that conducts the inward and forward flow of gases like hydrogen and oxygen into the rotationally capable discoid fuel cells, where the fuel cell reaction happens to generate electric current. The anode side, which is the electric current generation site, and, cathode side, electric current retrieval site, are shown as part of the rotationally capable discoid fuel cells. Also shown are the conduits that take the exhausts, water vapor, unused oxygen and air away from the rotational discoid fuel cell into the tubular hollowed conduits residing inside the central output shaft.

With reference to FIG. 1, there is shown a central axle output shaft, 12, attached to disc shaped fuel cells, 50. Although the fuel cells 50 could be any type of fuel cells, what follows in the discussion below is the description of hydrogen fuel cells. So, this discoid shaped fuel cell entity, 50, is composed of the following entities: an anode (negatively charged) end plate, 50a, an attached hard metal wire for carrying away current, 50b, a platinum carbon catalyst porous membrane, 50c, an electrolyte proton exchange material, 50d, then another platinum carbon porous catalyst membrane, 50e, next, a cathode (positively charged) end plate, 50f, and finally the hard metal wire that accepts returning current, 50g, as shown in FIG. 1. This is a standard PEMFC (Proton Exchange Membrane Fuel Cell), however, it is molded into a discoid shape which has a hollow center and this fuel cell resides inside a hard hollow cylindrical encasing, 48. The hollow cylindrical enclosing, 48, is made of a very strong material, plastic, or metal that can withstand high temperature and pressure and will not deform. The discoid shaped PEMFC, 50, are strongly secured inside the hollow cylindrical enclosing, 48, and affixed to the central axle output shaft, 12, at its inner cylindrical surface, as in FIG. 1.

Figure 2:
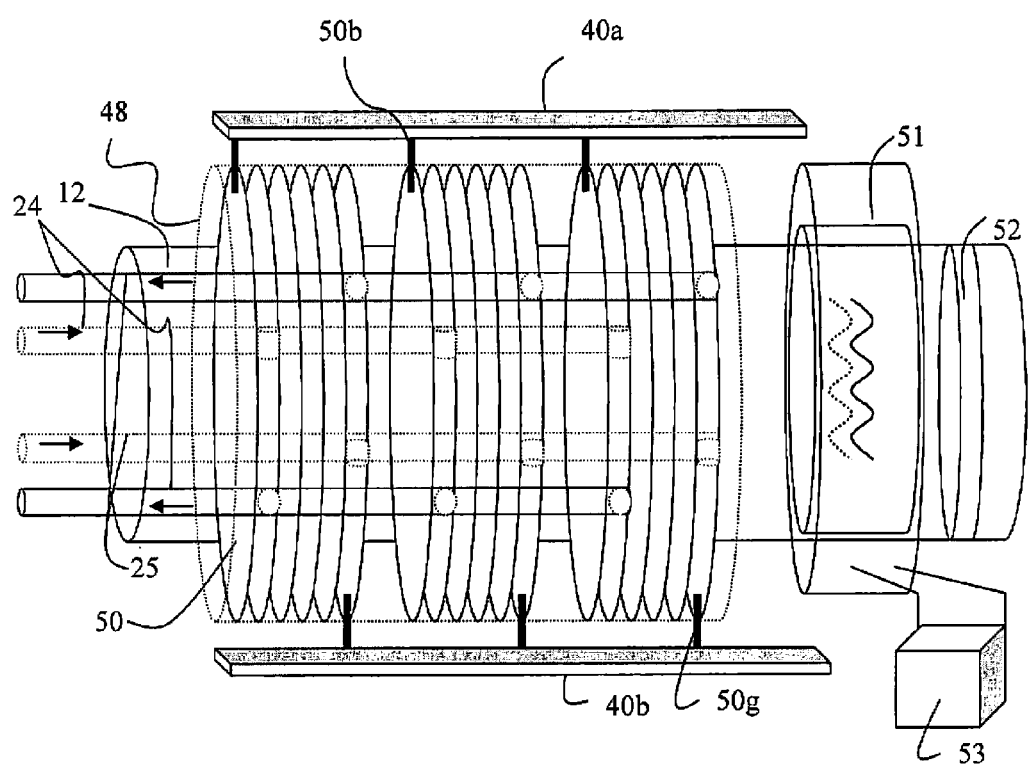
FIG. 2 A series of rotationally capable discoid fuel cells assembled along the length of the central axle output shaft with an electric current collector plate connected to the anode side and another electric current retriever plate connected to the cathode end of the discoid fuel cell; and shown are a non-articulating heater (with built in thermostat) placed to transfer heat energy via the output shaft into the rotational discoid fuel cells.

In such a configuration the discoid fuel cells, 50, are strongly attached onto the central output shaft, 12, so that during rotational motion of the central axle output shaft, 12, the fuel cells, 50, does not break apart. A series of these disc shaped fuel cells can be secured along the axial length of the central axle output shaft, 12, as shown in FIG. 2. Note, that a series of these discoid fuel cells can also be placed perpendicularly, in a vertical direction with respect to the central output shaft axis, 12. These discoid fuel cells, 50, can be placed at multitudes of angular configurations with respect to the axis of the central axle output shaft, 12, as well. (This one body construction of the apparatus (shown in FIG. 1 and FIG. 2), prevents the leakage of reactant gases (hydrogen and oxygen) as they are consumed and eliminated. So, the discoid fuel cells so described in the embodiment of the present disclosure are a tightly closed system.)

The central axle output shaft, 12, has four axial tubular conduit holes, 24b, 24e, 25b and 25e within its inner structure (FIG. 1). These axial tubular conduits have various other components, 24c, 24d, and 25c, 25d, as shown in FIG. 1. These entire conduit system, 24, 25, inside the central axle output shaft, 12, function to bring in the reactants hydrogen and oxygen gases into the discoid fuel cells, 50, and also carries away the by-products (or exhausts) of the hydrogen and oxygen reaction, which is mainly water vapor. (The arrows indicate the flow of gases in all the schematic depictions.)

Figure 4:
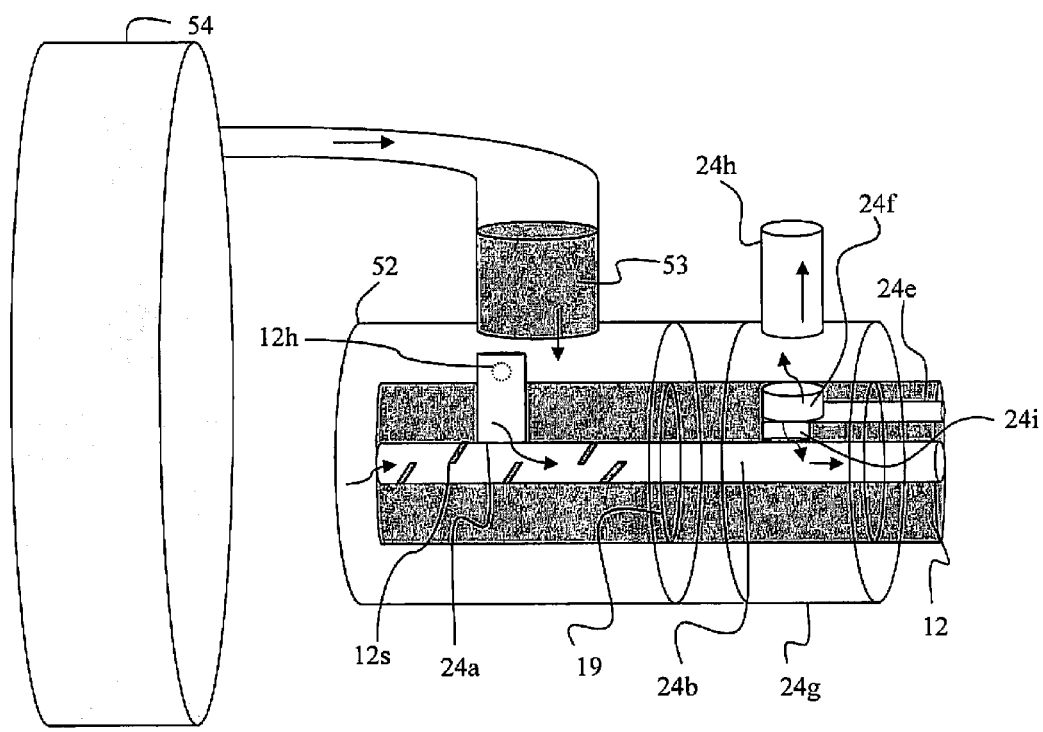
FIG. 4 Illustrated is an apparatus for delivering hydrogen gas to the fuel cell motor. Shown is the hydrogen tank, the actuator valve, the central axle output shaft supported by bearings (that act as sealants that prevent hydrogen gas leakage) with tubular hollow conduits for carrying the hydrogen gas to the rotationally capable fuel cells, and the enclosed gas chambers for the elimination of unused hydrogen. Alternatively, any unused hydrogen is routed back into the said tubular hollow conduit that carries the hydrogen gas to the fuel cells.

The delivery of hydrogen gas to the discoid fuel cells, 50, begins with the illustration in FIG. 4. Herein, the hydrogen gas tank container, 54, is attached to a valve actuator, 53, which when opened allows the hydrogen gas to enter into chamber, 52; from whence the gas traverses through the tube, 24a, which has a hole, 12h, that scoops at the hydrogen gas (especially during the rotational motion of the output shaft, 12) and delivers the gas into the axial conduit, 24b, to exit out of the inner hole, 24c, of FIG. 1. The hydrogen gas can also enter through the end cross sectional tubular hole of conduit, 24b, and be propelled along the conduit, 24b, by these small angulated hard spiral spiked twisting, 12s, like structures placed periodically along the entire rim and length of the tubular conduit, 24b, as shown in FIG. 4. Remember, that the entire disc shaped fuel cell, 50, is a secure closed entity, with the exception of the tubes coming out of it mainly, 24d, 25d, FIG. 1.

The aforementioned conduit system allows the hydrogen gas to come out from the hole, 24c, into the anode (negative electrode) side of the discoid fuel cell, 50a, FIG. 1. The interaction of the hydrogen gas with the anode side of the fuel cell, 50, PEMFC produces protons and electrons, and hence begins the process of DC current power generation. The DC current produced is collected by the hard wire, 50b, and deposited on the current carrying plate, 40a, as in FIGS. 1 and 2. Now, as the hydrogen gas enters a series of securely fitted discoid fuel cells, 50, which lies above and along the central output axle shaft, 12, more and more current is generated and collected by the current carrying plate, 40a, through the hard wire, 50b, as in FIGS. 1 & 2. (Note, again, that the arrows in all the figures depicts the flow of gases, be it hydrogen, oxygen/air or water vapor.)

The minimal unused hydrogen exhausts if there is any exits via conduit, 24d, and axial tubular conduit, 24e, which reside inside axle, 12, shown in FIG. 1. The unused hydrogen can exit through longitudinal perpendicular hole, 24f, as in FIG. 4, into the hollow cylindrical stationary enclosed entity, 24g, (which has bearings on either end to support the rotating output shaft, 12). The actuator valve, 24h, placed on, 24g, in FIG. 4, allows for the escape of the unused residual hydrogen gas. Alternatively, the residual hydrogen gas in, 24e, can be recycled back through the conduit, 24i, which connects conduit, 24e, to conduit, 24b, as in FIG. 4. When the hydrogen gas is recycled back to form a closed system for the rotating fuel cell system then the need for entities, 24h, 24g, and 24f, can be eliminated. Note the entities and chambers containing hydrogen gas are made to be leakage proof, again, constituting a tight enclosed system.

Figure 5:
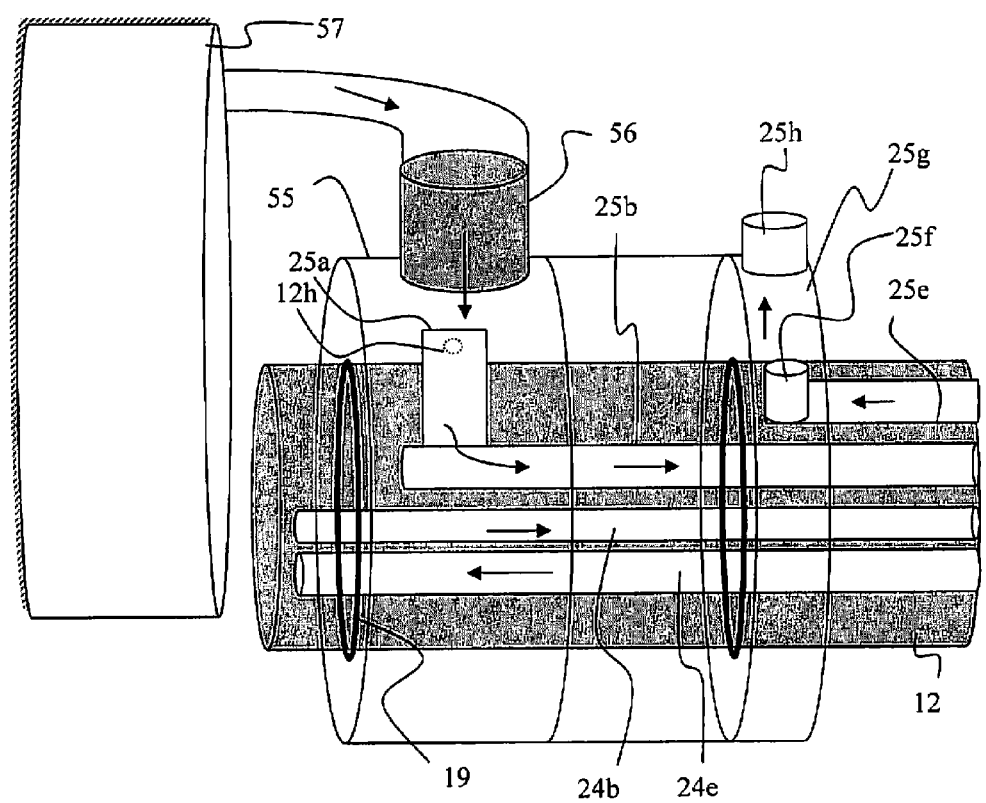
FIG. 5 Illustrative diagram for the delivery of oxygen gas to the fuel cell motor. Shown is the oxygen (or air) tank, valve actuator, hollowed tubular conduits inside the central output shaft for carrying oxygen (or air) toward rotating fuel cell. Also shown are bearings to hold the rotational central output shaft and that these bearings act as a sealant to prevent gas leakage. The two cylindrical gas chambers shown are stationary with respect to the central axle output shaft; and, one chamber is responsible for delivery of oxygen into the tubular hollowed conduit inside the output shaft and the other chamber is responsible for the elimination of the water vapor, air or any unused oxygen as exhausts.

When the hydrogen gas arrives at the rotating fuel cells, 50, then, at the same time, as in FIG. 5, from the oxygen/air gas tank, 57, the oxygen gas makes it way to the rotating fuel cells, via the valve actuator, 56, to enter the gas scooping hole, 12h, into the axial tubular conduits, 25a, 25b, (FIG. 5), and to finally exit through the hole, 25c, of FIG. 1. In this arrangement the oxygen (or air) gas is released into the cathode (positive) side of the discoid fuel cell, 50e, and 50f, of FIG. 1 and FIG. 2. At the cathode side, 50e, 50f, the available oxygen reacts with the hydrogen protons coming from the anode side, 50a, as well as the returning current (electrons) through the current retriever collector plate, 40b, into the hard wire, 50g; and all reacting together to form water vapor.

The current generated at the anode goes through electromagnetic winding poles and return back to the cathode side of the rotating fuel cells, as explained below. The water vapor formed exits out of fuel cells, 50, into the tube, 25d, which channels the vapor into axial tubular conduit, 25e, as in FIG. 1 and FIG. 2. A perpendicular tube or hole, 25f, with respect to the main axle, 12, as shown in FIG. 5, act as a conduit to let water vapor out from, 25e, into the hollow enclosed chamber, 25g, as in FIG. 5. The entity 25g is hard hollow cylindrical metal or plastic stationary entity that acts as a container for water vapor, residual unused oxygen and air exhausts, by enclosing them within the non leaking bearings on either ends of the chamber, 25g, and, while allowing the central axle, 12, to pass unimpeded from either side of, 25g, as in FIG. 5. (Again, the entity, 25g, does not allow for the leakage of gasses and is part of the bigger hollow encasing cylindrical container, 14, FIG. 2.)

The water vapor is the exhaust to be eliminated and exits out into the open through the actuator valve, 25h, as in FIG. 5. The valve, 25h, allows for the measured release of water vapor keeping enough water vapor pressure inside the tubular conduit, 25e, and subsequently inside the rotating fuel cells, 50, to keep the fuel cells moist for optimal functioning.

Figure 6:
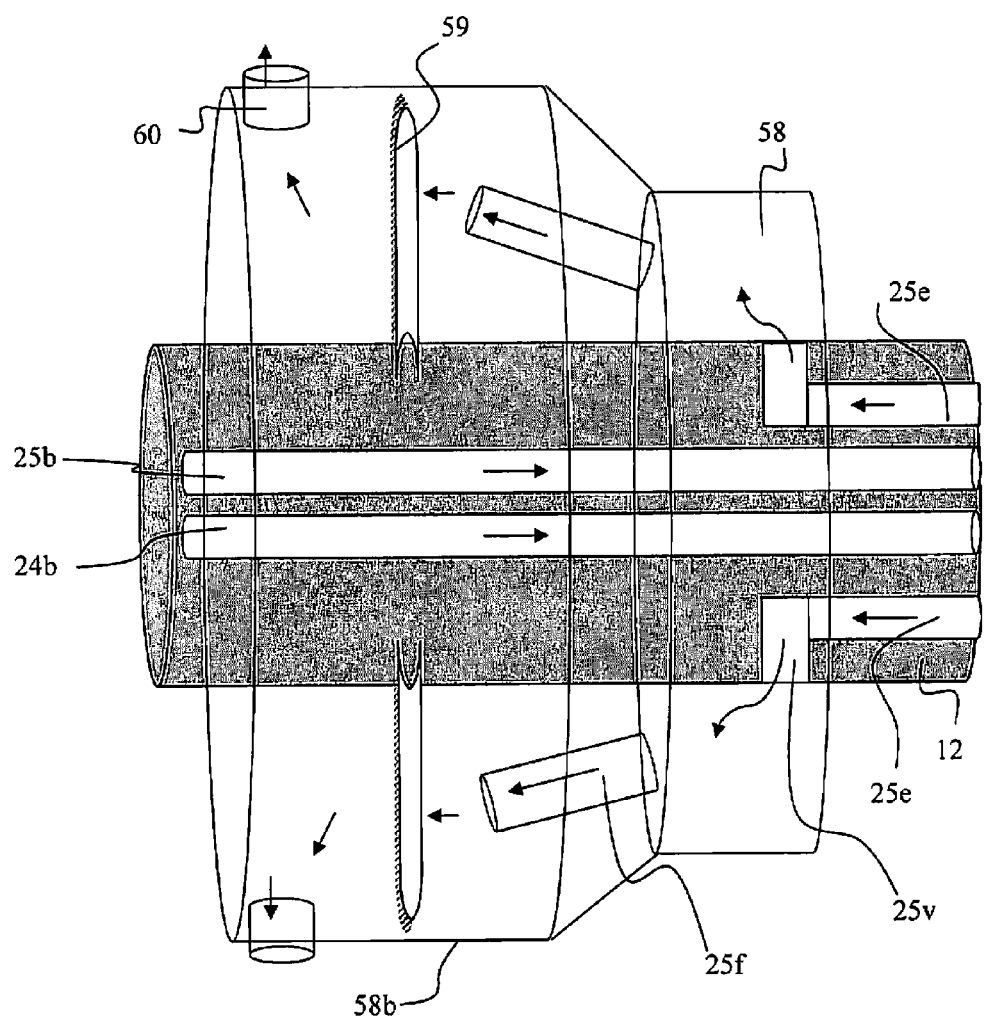
FIG. 6 Shown is an apparatus for the elimination of exhausts, primarily water vapor, wherein, tubular conduit inside the central output shaft allows for the emptying of water vapor into a stationary cylindrical chamber. From this chamber the water vapor and unused oxygen (or air) enters another stationary chamber through a set of small sturdy stationary tubes, under high pressure conditions to interact and provide force onto a set of turbine (or fan) blades that are attached to the central axle output shaft. The pressurized water vapor rotates the blades and then exits out through the set of valves which are circumferentially arranged around the bigger stationary water vapor chamber.

Alternatively, the water vapor exhausts can also be made to do work, whereby the water vapor coming out of tubular conduit, 25e, goes into the hole, 25v, of the output shaft, 12, then, enters into the stationary hollow cylindrical vapor containing chamber, 58, as in FIG. 6. The water vapor then exits out of the angular tube, 25f, which is jutting out of the small water vapor stationary chamber, 58, into the large water vapor chamber, 58b, which houses the turbine blades, 59, FIG. 6.

Then, the vapor is categorically channeled onto the turbine blades (or fans), 59, as in FIG. 6. The stationary hollow cylindrical chamber, 58, allows the central output shaft, 12, to enter and exit, without allowing leakage of water vapor or gasses through the tight fitting leakage proof bearings, 19. The turbine fan blades, 59, is permanently attached to the central axle output shaft, 12, and the pressure from water vapor while turning the turbines, 59, creates additional rotational motion onto the central output shaft, 12, as in FIG. 6.

Now, the main function of the fuel cell motor is to have the central output shaft, 12, rotate. The main rotational motion of the output shaft, 12, comes from the permanently affixed electromagnet coil winding poles, 63a, 63b, to the rotationally capable discoid fuel cells, 50, which are all robustly attached to central axle output shaft, 12, see FIG. 3a. The poles, 63a, 63b are robustly attached to a strong metallic hollow cylindrical entity, 64, and sits on its outer surface. On the inner surface of, 64, is robustly attached rotating fuel cells encasings, 48, (FIG. 1) and in between, 64, and, 48, lies the current collector and retriever plates, 40a and 40b, as in FIG. 3a. Now, one set of electromagnetic poles are stationary, 63c, 63d, which forms the stator winding pole coils, and the other set, 63a, 63b, are the free moving pole coils, experiencing rotational motion and forms the armature poles of the fuel cell motor, FIG. 3a.

Again, the fuel cell reaction, which begins at the anode end (negatively charged), 50a and 50c, and as hydrogen interacts with platinum carbon catalyst membrane, the electric current thats generated are collected through an attached hard metal piece, 50b, onto the current collector metallic plate, 40a, as shown in FIG. 2. The current collector plate, 40a, delivers the newly generated DC electric current to the permanent metallic wire connection, 61a, and also to the commutator, 62a, as shown in FIG. 3a.

Figure 3A:
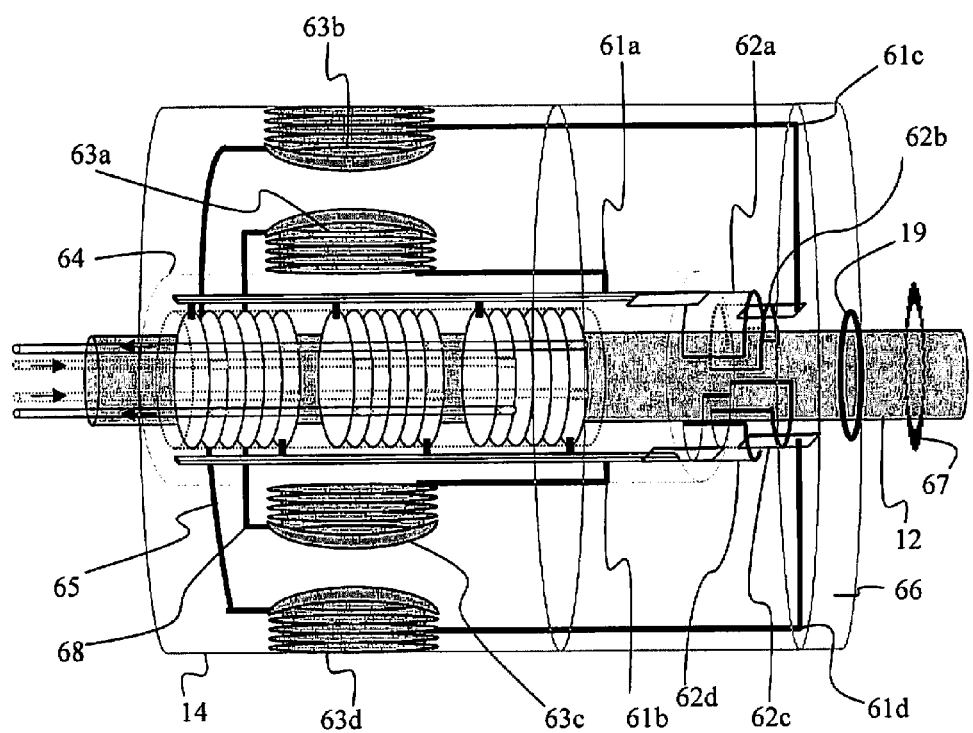
FIG. 3a The embodiment of the said present disclosure where the fuel cell motor is displayed, shown are the electromagnet armature poles, electromagnet stator poles, connecting wires, and the rotational fuel cells all constructed around the central output shaft. This is a parallel circuit type of fuel cell motor design.

This electric wiring configuration of, FIG. 3a, exemplifies a parallel circuitry for the Fuel Cell Motor. From the commutator, 62a, the electric current goes to the motor electricity conducting brushes and stator, 62b, see FIG. 3a. So, the stator part of the Fuel Cell Motor comprises of motor electricity conducting stationary brushes, 62b, the stationary electromagnet winding poles, 63b, 63d, the stationary solid disc, 66, and the encasing, 14, as in FIG. 3a. The entity, 66, besides being stationary is a solid full thickness disc made of metal or plastic and has a robust bearing, 19, to hold and support the central output axle, 12, shown in FIG. 3a and FIG. 3b. The outside stator electromagnet poles, 63b, 63d, are strongly and tightly bound onto the inner surface of the stationary hard metal or plastic encasing, 14, see FIGS. 3a and 3b.

Again, the electric current generated from the rotating discoid fuel cells, in the presence of supplied hydrogen and oxygen, goes from collector plate, 40a, to the wire, 61a, and, at the same time into the commutator, 62a, and the stator, 62b, reaching into the stator wire, 61c, FIG. 3a. The current from wire, 61a, supplies the pole winding, 63a, and the current from wire, 61c, supplies the pole winding, 63b, FIG. 3a, again, at the same time. It is readily apparent that the magnetic fields created between pole, 63a and 63b, through the supply of current, is congruent and the same between these opposing poles, as shown in FIG. 3a, and these magnetic fields so generated are perpendicular with respect to the central axle, 12.

The polarities of the congruent magnetic fields oppose and repel each other, thus, exerting a rotational torque on the freely movable armature pole, 63a, which is attached to the central axle output shaft, 12. Henceforth, the armature pole, 63a, moves by rotating on its axis, together with the tightly attached discoid serial fuel cell stacks, 50, and the robustly affixed central output axle shaft, 12, as in FIG. 3a.

Meanwhile, the electric current from pole, 63b, goes via the stationary wire, 65, (attached to the inner surface of stationary encasing cylinder, 14), to the electromagnetic pole, 63d, FIG. 3a. From the pole, 63d, the current travels via the stationary wire, 61d, (attached to the inner surface of the encasing, 14), back into the stator electricity conducting brushes, 62c, which relays the current into the commutator, 62d, FIG. 3a. From the commutator, 62d, the current finally returns back into the current collecting retriever plate, 40b, completing the circuit that started from the anode and ends into the cathode (negative terminal to positive terminal), as in FIG. 3a.

More so, the current that leaves the pole, 63a, goes into the wire, 68, which wounds around the strong cylindrical encasing entity, 64, to attach and supply current to the pole, 63c, as in FIG. 3a. From the armature pole, 63c, the current flows into the wire, 61b, which connects to the current collector retriever plate, 40b, and so the current streams into, 40b, FIG. 3a. Then, from the current collector retriever plate, 40b, the electricity goes into the cathode side of the PEMFC, fuel cells, 50, via the hard wire, 50g, henceforth completing the circuit, as the current goes from anode side of the (rotating) fuel cells, to the cathode side, (from negative to positive terminal), as in FIG. 3a.

Finally, the electricity made to pass through the opposing poles, 63c and 63d, creates congruent same polarity magnetic field, as in FIG. 3a. And this congruent same polarity magnetic fields oppose and repel each other so to exert a mechanical torque on the freely movable armature pole, 63c, henceforth, rotating this pole on its axis. Since the pole, 63c, is attached to the rotational fuel cells, 50, and the output shaft, 12, the desired rotational motion of the main output shaft, 12, is therefore accomplished, FIG. 3*a*.

To keep the main output shaft, 12, perpetually rotating, the attached fuel cells, 50, must generate continuous electric power. The DC current from the fuel cells, 50, eventually goes through the electromagnet pole windings 63*a*, 63*b*, 63*c*, and 63*d*, almost simultaneously, and due to configured circuitry of FIG. 3*a*, (and FIG. 3*b*) the generated magnetic field between the pole windings, 63*a* and 63*b*, 63*c* and 63*d*, then, 63*a* and 63*d*, 63*c* and 63*b*, is of the same congruent polarity that categorically creates an opposing repelling force on each of the aforementioned poles, however, only the rotationally capable free armature pole windings, 63*a*, 63*c*, experience motion, which, then rotate the central output shaft, 12, continuously; thusly, manifesting the rotational motion of a motor or an engine output shaft, as in FIG. 3*a* and FIG. 3*b*. Although a pair of two electromagnetic poles are illustrated in this design of the fuel cell motor, one can easily construct multi-pole system to augment the power, and rotational torque of the fuel cell motor.

Figure 3B:
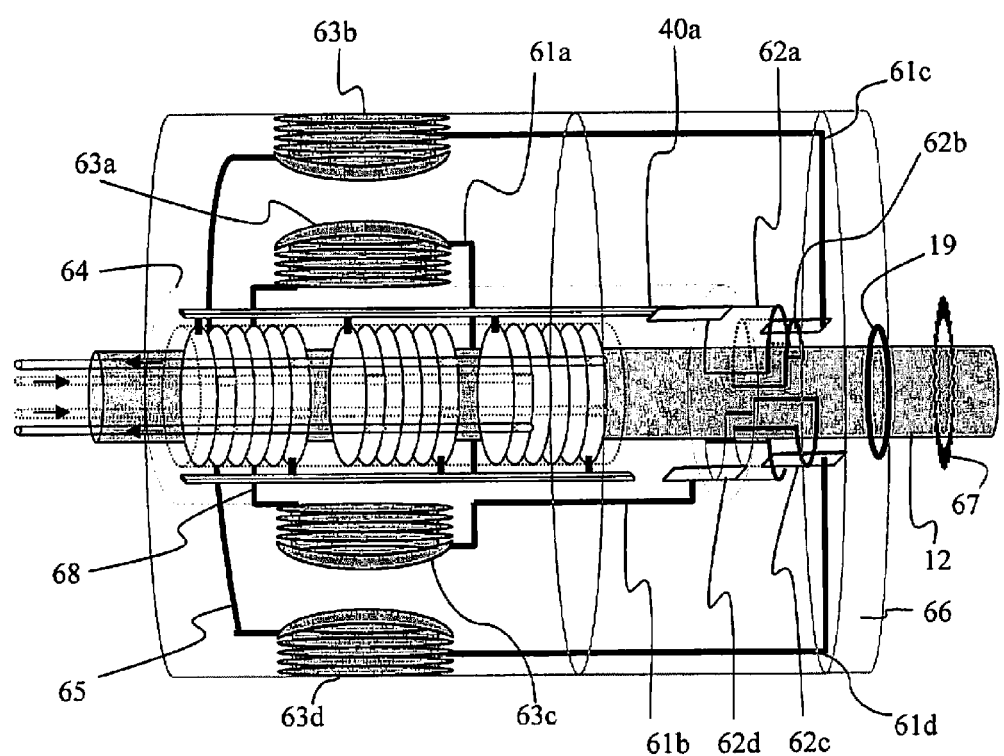
FIG. 3b Shown is a series type of electrical circuit built into the rotationally capable discoid shaped fuel cell motor.

Now, instead of a parallel circuitry for the fuel cell motor as exemplified in FIG. 3*a*, one can make a series type current circuitry for the fuel cell motor which is illustrated in FIG. 3*b*. And, FIG. 3*b*, represents the series circuitry, where everything is the same as compared to the parallel circuitry of FIG. 3*a*, however, the current generated by the rotational fuel cells, 50, goes from the current collector plate, 40*a*, directly into the commutator, 62*a*, FIG. 3*b*. From the commutator, 62*a*, the electricity travels into the stator, 62*b*, through the electricity conducting brushes and then into the stationary wire, 61*c*, embedded in the stationary solid thickness disc, 66, to reach into the pole, 63*b*, FIG. 3*b*.

From the stationary stator pole, 63*b*, the current travels through the stationary wire, 65, to reach the other stationary stator pole, 63*d*, then, the current continues into the stationary wire, 61*d*, embedded in the stationary solid disc, 66. From the wire 61*d*, the electric current goes into the stator, 62*c*, and through the electricity conducting brushes into the commutator, 62*d*, to reach into the pole, 63*c*, as schematized in FIG. 3*b*.

Then, from armature pole winding, 63*c*, and using the rotating wire, 68, the current enters into the armature pole, 63*a*, and travels via the another rotating wire, 61*a*, into the current collector retriever plate, 40*b*; henceforth, completing the entire series circuitry for this type of fuel cell motor. From the aforementioned electrical circuit configuration of FIG. 3*b*, it is evident that the opposing poles, 63*a* (armature pole) and 63*b* (stator pole), 63*a* (armature pole) and 63*d* (stator pole), 63*c* (armature pole) and 63*d* (stator pole), 63*c* (armature pole) and 63*b* (stator pole); are pole pairings experiencing a congruent same polarity magnetic fields that repel each other, and, which results in the rotational motion for the armature poles, the attached rotational fuel cells and the central output shaft, 12. Thus, the series circuitry function of the fuel cell motor is so described above, and shown in FIG. 3*b*.

Another main component of the fuel cell motor is the stationary hollow cylindrical encasing, 14, which contains and supports the central output shaft, 12, that stick out of, 14; contains in its inner space the rotational discoid serial fuel cell stacks, 50, the electromagnetic poles, 63, the commutators, 62*a*, 62*d*, and stators, 62*b*, 62*d*, all arranged in an apparatus to result in a functional motor, FIG. 3*a*. (Note, that a gear, 67, is attached to central output shaft, 12, in FIG. 3*a*, (and in other figures) for the purposes of running other mechanical devices, when the output shaft is in rotational motion.) The other end of the central output shaft, 12, is supported and stabilized by entities, 24*g* and 54, in FIG. 4 as well as, 25*g* and 55, of FIG. 5.

The small gas delivery chambers, 52, (FIG. 4 for hydrogen) and, 55, (FIG. 5 for oxygen) are metal or plastic hollow cylindrical encasings that has bearings on its either side for supporting the central axle, 12, which passes through these chambers, 52 and 55. The bearings which articulates with central output shaft, 12, and attached to the small gas chambers, 52 and 55, not only allow the rotational motion of the output shaft, 12, to occur but acts as a sealant preventing any gas leakage out of these small gas chambers, 52 and 55, FIG. 4 and FIG. 5. These small gas delivery chambers, 52 and 55, are stationary and are contiguous with the adjoining central encasing, 14, of FIG. 3*a*.

The valve actuators, 53 and 56, are attached to the gas delivery chamber 52 and 55, respectively, and when operated upon and opened, releases the hydrogen gas and oxygen/air into their respective small gas delivery chambers. These gasses then enter the central axial bored out tubular conduits, 24*b*, and 25*b*, (through the holes 12*h*) inside the central axle output shaft, 12, FIG. 4 and FIG. 5, and head towards the discoid fuel cell apparatus, 50, of FIGS. 1, 2, 3*a*, 3*b*. All for the purposes of a chemical reaction between hydrogen and oxygen molecules in the presence of fuel cell catalyst, 50.

When the actuator valves, 56 and 53, is operated on again as in shutting down the gas flow through the valve thus manipulating the availability of hydrogen and oxygen gasses to the rotating fuel cells, 50, leads to the attenuation of the hydrogen and oxygen reaction inside the rotational discoid fuel cell stacks, 50, and subsequently, there is slowing down of the current and power generation by the rotating fuel cells, 50. Changes in availability of electric current directly correlate with changes in magnetic fields in the electromagnet pole windings, 63, which correlates with the rate of the rotational motion of the main axle output shaft, 12. Thus the rate of rotational motion of the central output shaft, 12, decreases, comes to a halt, or speeds up depending on the rate of availability of the fuel source, i.e. hydrogen and oxygen, through the actuator valves, 53 and 56.

In FIG. 2, a heater, 51, that circumscribes the central axle output shaft, 12, and which is hooked up to a battery, 53, provides for increased heat and temperature (transmitted via the output shaft, 12) into the rotational fuel cells, 50. The additional heat and increased temperature may be needed to augment the function of the rotational fuel cells. The affixed entity, 52, of FIG. 2, (present on either end of output shaft, 12, not shown) is an insulator preventing heat dissipation into the rest of the central output shaft, 12, and thereby confining the heat only into the area of the rotational fuel cells. Furthermore, the heater, 51, can be attached to a thermostat which is hooked up to a calibrated electronic device that regulates the heaters, 51, temperature and heat transmission into the rotational fuel cells.

Figure 7:
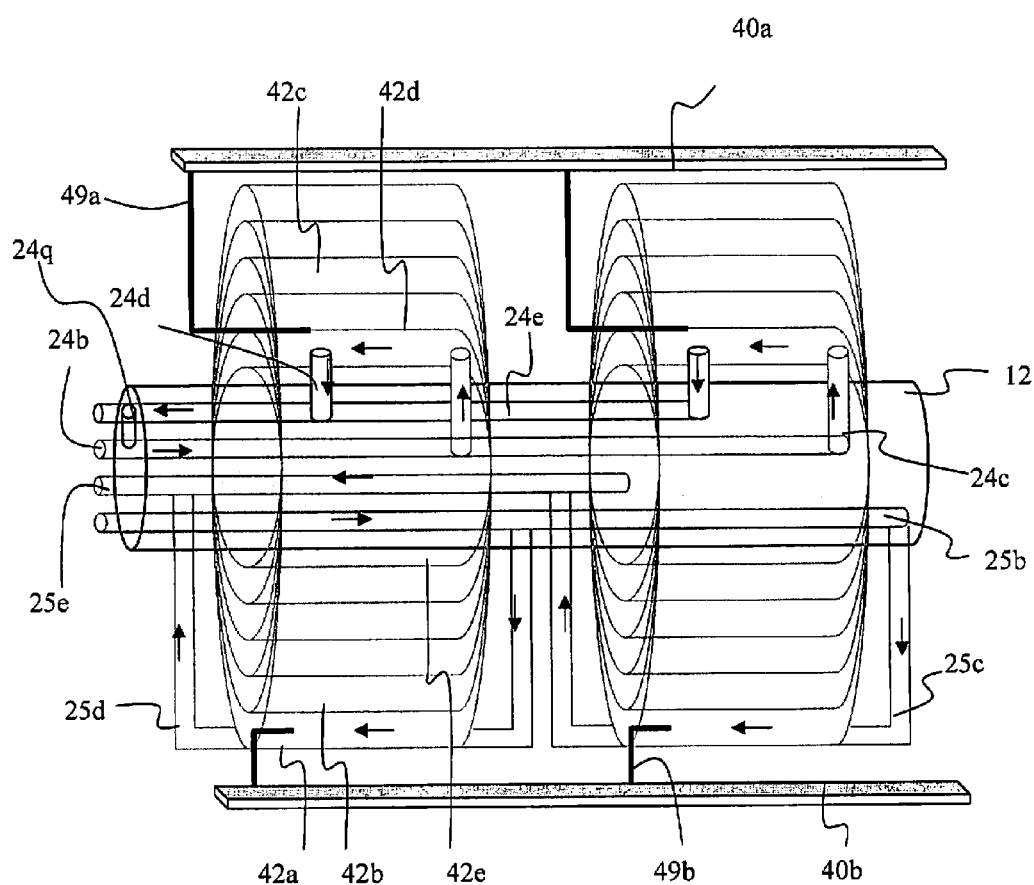
FIG. 7 A cylindrically configured fuel cell design which is also a capable of experiencing rotational motion, hence, rotational cylindrical fuel cell motor; with the central axle output shaft, that has tubular conduits, allowing fuel gases to enter and exhausts to exit, the rotational cylindrical fuel cell. Shown also is the electric current collecting stiff wires and plate emanating out of the anode side and current retrieval plate at the cathode side of the cylindrical fuel cell; and, all of which are preserved in hard robust cylindrical encasing around the output shaft. The rotational cylindrically configured fuel cells are placed one after another, in a serial fashion, along the axial length of the central output shaft.

Moving on to another, fuel cell motor configuration, a rotationally capable cylindrical fuel cells system, as shown in FIG. 7, which is very similar in design to the discoid fuel cell of FIGS. 1, 2, 3*a*, 3*b* and 4, is so constructed; wherein, 42*e*, is the anode (negative) cylindrical fuel cell membrane, where the hydrogen electrons are collected and hydrogen protons generated. And the porous platinum carbon cylindrical membrane, 42*d*, acts as a catalyst for the hydrogen gas, and the protons goes through the electrolyte membrane, 42*c*, and arrives at the other platinum carbon cylindrical membrane, 42*b*, (FIG. 7).

At this site, 42*b*, oxygen (available through tubular conduit, 25*c*), undergoes catalysis and combines with hydrogen protons and electrons (available through hard wire, 49b) to form water vapor. The cathode (positive plate) cylindrical plate like membrane, 42a, is where the current returns, as in FIG. 7. For the current to be generated the hydrogen and oxygen gas reactions starts when the hydrogen gas enters the cylindrical fuel cell from the axial hollow tubular conduit, 24b, through the small tubular hole, 24c, to interact at the anode, 42e and 42d; and the oxygen comes in through conduits, 25b and 25c, to have a reaction at the cathode end, 42b and 42a, FIG. 7.

The hydrogen and oxygen gases come from the gas tank apparatus of FIG. 4 and FIG. 5. Most hydrogen gas molecules react in the presence of the catalyst at the anode, however, any remaining residual hydrogen gas, which has not undergone any reaction exits through the perpendicular tubular hole, 24d, and exit through the hollow tubular conduit, 24e, FIG. 7. The unused residual hydrogen gas is recycled back into the axial conduit, 24b, through the connecting tube, 24q, to be completely consumed. Hence, the system is a closed gas tubular conduit system.

When the hydrogen protons and electron disassociate at the anode with help of the catalyst, the protons begin to travel from, 42e, to the cathode end, 42a, as in FIG. 7, meanwhile the electrons and the currents travel into hard metallic wire, 49a, and then into current collector plate, 40a, making it negatively charged. From, 40a, the current travels into the commutator, 62a, and then through the electricity conducting brushes goes into the stator, 62b, as in FIG. 8. Then, from the stator wire, 61c, the current goes into upper electromagnet winding pole, 63b, then into stationary wire, 65, then into the lower electromagnet winding pole, 63d, from there the current returns into the stator, 62c, and then back into the commutator, 62d, as in FIG. 8.

Figure 8:
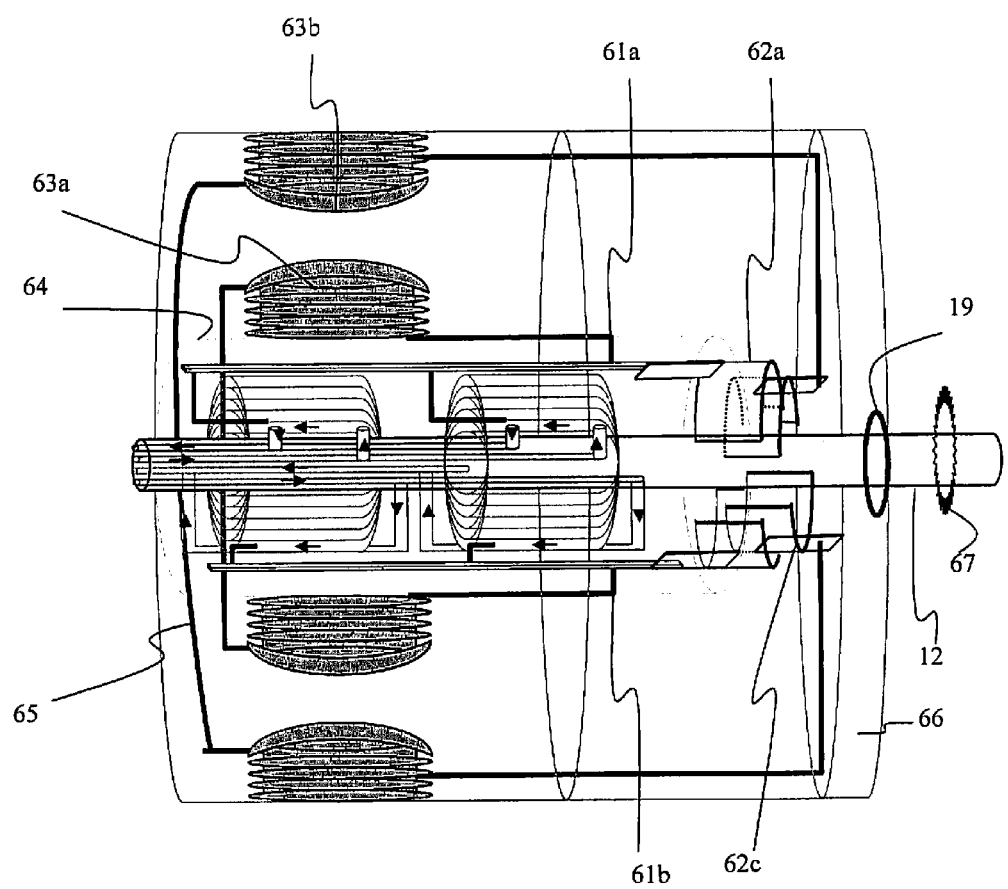
FIG. 8 The rotational cylindrical fuel cell motor with electromagnet armature poles, commutator, stator and stator electromagnet poles, attached to cylindrical fuel cells of FIG. 7, to make up a one-body constructed functional fuel cell motor. Note that the electrical circuit is a parallel type of circuitry in this figure.

From the commutator, 62d, the current travels into the adjoining current collector retriever plate, 40b, then, through the hard wire, 49b, into the cathode (positive) side of the rotating cylindrical fuel cells, 42a and 42b, (FIG. 7), where the oxygen gas reacts with hydrogen protons and electrons to form water vapor, FIG. 8. The oxygen gas from the gas tank of, FIG. 5, goes through the axial tubular conduit, 25b, inside the central output axle shaft, 12, and enters the cylindrical cathode plates in-between, 42a, and 42b, as FIG. 7. After the reaction and recombination of the hydrogen and oxygen into water at, 42a and 42b, any unused oxygen, air and water vapor leaves through the sturdy perpendicular tubular conduit, 25d, to enter the adjoining tubular axial conduit, 25e, residing inside the output shaft, 12, FIG. 7. The water vapor exhausts are eliminated in a similar fashion as described and shown in FIG. 5 and FIG. 6.

Again, similar to the discoid fuel cell apparatus, of FIG. 1, the cylindrical fuel cells generate DC current from the availability of hydrogen and oxygen gasses. The cylindrical fuel cells are securely placed in a protective rigid hollow cylindrical encasing, 64, so that it, 42, does not fall apart during rotational motion of the fuel cell motor, FIG. 8.

The current generated from the cylindrical fuel cells then travels into the electromagnet winding pole, 63a, to create a North and South magnetic polarity (outwardly along the radial direction of the output shaft), and at the same time the presence of current in electromagnet stationary stator pole, 63b, creates another radially (with respect to output shaft) opposing and similar strength magnetic field of North to South polarity. So, the magnetic polarity of electromagnet winding pole, 63a, being of the same strength repels the magnetic field generated out from pole, 63b, causing an exertional mechanical torque on the freely rotational armature pole, 63a, as in FIG. 8. And at the same time, the current travels through the rotating wire, 68, from the pole, 63a, to the other armature pole, 63c, in which a South (perpendicularly inward with respect to the axis of output shaft), and North (perpendicularly inward with respect to the axis of output shaft), magnetic polarity is created which is of the same polarity magnetic field emanating from the outside stator electromagnet pole winding, 63d, as in FIG. 8. And, when the current reaches pole, 63d, by traveling from the pole, 63b, via the stationary wire, 65, which is permanently attached to the undersurface of hollow cylindrical casing, 14, as in FIG. 8, the congruent but repelling magnetic polarity between armature pole, 63c and the stator pole, 63d, creates, another mechanical rotational torque, only, onto the freely movable armature pole, 63c, of FIG. 8.

Since, the armature pole, 63a and 63c, are attached to the cylindrical fuel cells, 42, via, 64, and the cylindrical fuel cells are attached to the central output axle, 12; the whole structural configuration rotates upon the rotational motion of the armature poles, 63a and 63c, FIG. 8. Note that rotational cylindrical fuel cell motor configuration is exactly the same as the discoid fuel cell motor schema except that the fuel cells are cylindrically shaped and cylindrically arranged around output shaft, 12.

In this embodiment of the cylindrical fuel cells as the hydrogen enters the undersurface of the anode part of the fuel cells, the rotational motion of the main output shaft, 12, causes the hydrogen gas molecules to diffuse precipitously throughout the electrolyte and the platinum carbon membrane due to the presence of huge centrifugal forces; overall, creating a highly reactive environment within the cylindrical rotating fuel cells for the efficient reaction of hydrogen and oxygen to take place.

In essence, in the fuel cell motor, there may not be a need for the presence of a priori high pressure conditions to force hydrogen and oxygen to react, as high pressure conditions may be needed within the conventional fuel cell battery system. The need for greater pressure and temperature is therefore reduced as the rotational motion of the fuel cell motor forces the reactants into a greater and efficient reaction process. So, in this novel design of the fuel cell motor less pressure and less temperature are needed to operate this device as compared to a conventional fuel cell battery attached to a motor.

Figure 9A:
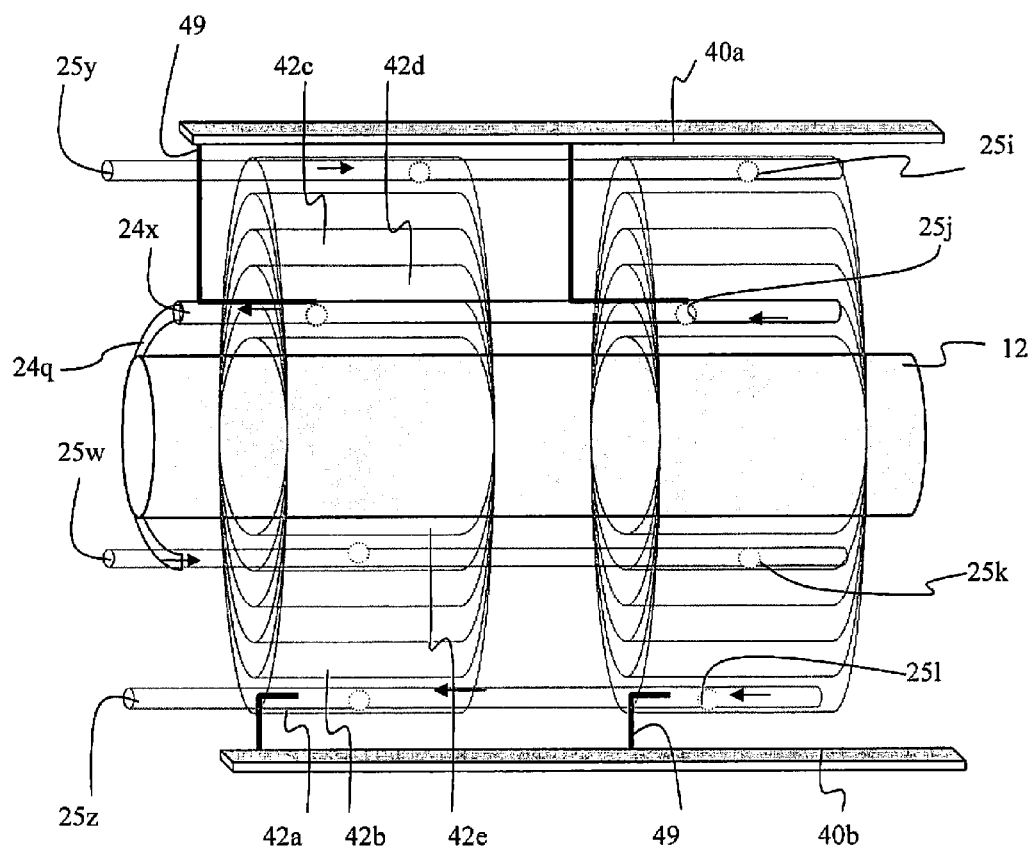
FIG. 9*a* The rotationally capable cylindrical fuel cell design, wherein, the oxygen, hydrogen and water vapor carrying tubes are not embedded inside the central axle output shaft but rather these gas tubes originate out of the cylindrical fuel cells themselves. Note that the hydrogen carrying tubes are a closed circuit gas recycling system.

In another version of these rotating cylindrical fuel cells, the axial tubular conduits inside the central output shaft, 12, are replaced with another set of parallel peripheral axial tubes, 25z, 25y, 24x, and 25w, which emanate out from the cylindrical fuel cell apparatus, as shown in FIG. 9a. Now, FIG. 9a is similar to FIG. 7, except these rotating cylindrical fuel cells have gas tube lines lie outside the main output shaft, 12. The ingoing sturdy axial tube, 25w, as shown in FIG. 9a, carries in the hydrogen gas that exits through the pore, 25k, at the anode end of the cylindrical fuel cells.

The outgoing outside axial tube, 24x, carries away any unused residual hydrogen gas through the pore, 25j, and re-cycles back hydrogen gas into axial tube, 25w, via the connecting conduit, 25q, as shown in FIG. 9a. Similarly, the oxygen (or air) enters through the outside axial tube, 25y, as in FIG. 9a, and exits through the pore, 25i, to interact with the cathode side of the rotating cylindrical fuel cells. Any unused oxygen and formed water vapor exits out through the pore, 25l, then through the axial tube, 25z, to the outside as in FIG. 9a.

Within these axial tubes and conduits uni-directional valves can also be placed to prevent back flow of gases. Note that these sets of axial tubes, 25z, 25y, 24x, and 25w, experiences rotational motion with the central axle output shaft, 12, as these tubes 25*z*, 25*y*, 24*x*, and 25*w*, are attached to the central output shaft, 12, via cylindrical fuel cell, 42, as in FIG. 9*a*. These tubes are further provided support by an adjoined solid thick disc, 91*z*, affixed to the output shaft, 12, as in FIG. 9*b*.

Figure 10:
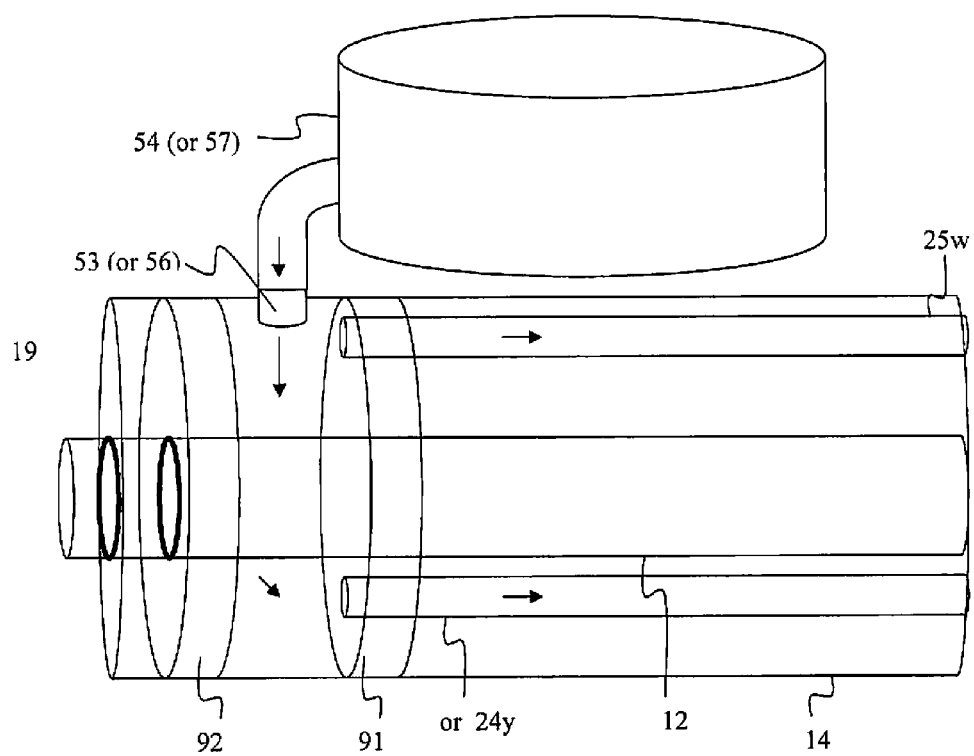
FIG. 10 Shown is another gas chamber design for the delivery of hydrogen or oxygen gas into the fuel cell motor. Herein, a gas storage tank attached to an actuator valve which allows gas to enter the strong tubular conduits that rotates with an attached stabilizing solid disc which is also affixed to the central output shaft. The thick rotating solid disc is a sealant especially at its outer diameter edges and does not allow for leakage of gasses while in motion or even while stationary. The other solid disc is stationary and has a central hole with bearings that not only holds the central output shaft during its rotational motion but also act as sealant to not allow the gases to leak. The arrow denotes the direction of gas flow.
Figure 11:
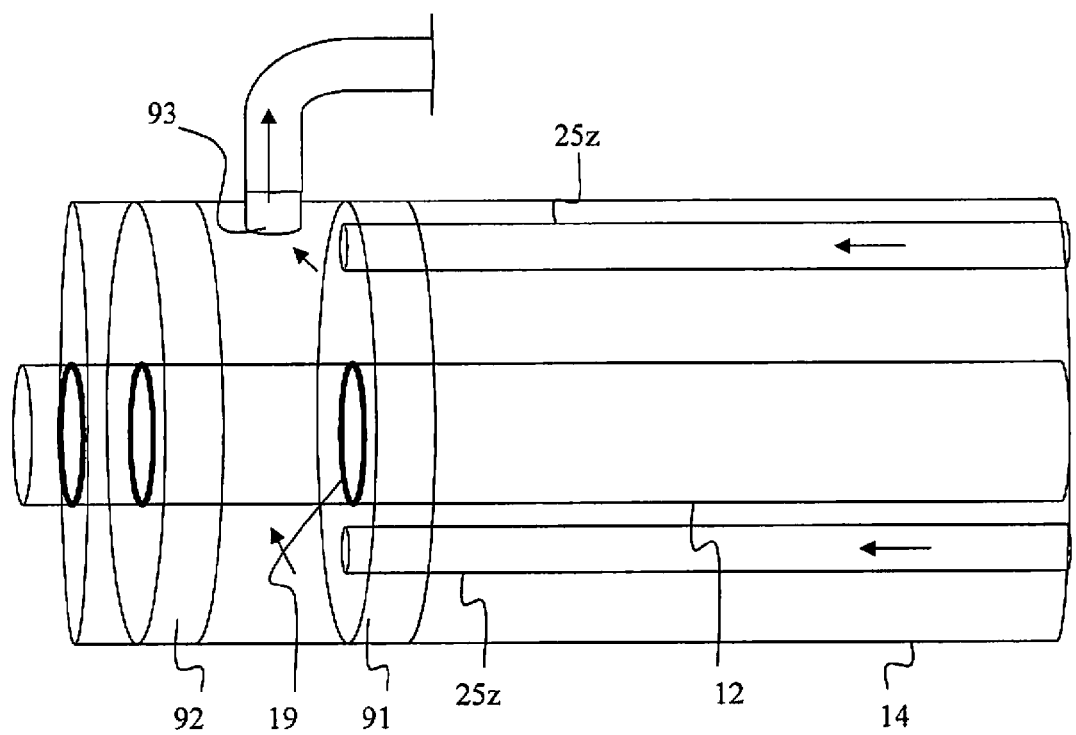
FIG. 11 Shown is an elimination chamber for exhausts, like water vapor, air and unused oxygen and is similar to the schematic in FIG. 10.

Now, to deliver hydrogen and oxygen gases into tubes 25*z*, 25*y*, 24*x* and 25*w*, (and then into these types of rotational cylindrical fuel cells, 42), another apparatus set up as shown in FIGS. 10 and 11, are so described. The hydrogen (or oxygen) gas container/tank is shown as, 54 (or 57), and these gases are released through the actuator valve 53 (or 56), as in FIG. 10, into the axial tube 24*w* (or, 25*y*) through a chamber defined by entities, 91 and 92.

A rotationally capable solid thick disc, 91, that articulates with the inner surface of the outer case covering cylinder, 14, is so designed not to allow gas leakage by the presence of an outer diameter reinforced rubber sealants, as in FIG. 10 (and FIG. 11). This rotational solid disc, 91, has a central hole to which the central axle output shaft, 12, is affixed, FIG. 10. The other disc, 92, as shown in FIG. 10 (and FIG. 11), is stationary and has a hole with a bearing, 19, to hold and support the central axle output shaft, 12, especially during the shafts rotational motion. The bearing, 19, in this configuration also acts as sealant to prevent gas leakage (FIG. 10 and FIG. 11). Again, these solid thick discs, 91, 92, are completely sealed preventing leakage of any gases.

When the gas leaves the actuator valve 53 (or 56) and enters the closed chamber between the solid thick discs, 91 and 92, it has nowhere to go but into the tubes, 24*w*, for the hydrogen gas (or into 25*y* for oxygen gas), as in FIG. 10. Remember, that the hydrogen gas chamber defined between, 91 and 92, is a separate from the oxygen gas chamber defined by, 91 and 92, (although same illustrative schematic diagram is being used), and therefore, one of the tubes, 25*y* or 24*w*, is the conduit for chamber between, 91 and 92. And the other tube, be it 25*y* or 24*w*, simply passes through the chamber between, 91 and 92, and enter another chamber similar to 91 and 92, where it has access to either hydrogen or oxygen gas.

Now, in FIG. 11, the exhausts primarily water vapor, air and residual oxygen, coming out of rotational cylindrical fuel cell, 42, enters the rotational tube, 25*z*, and has a similar apparatus arrangement as FIG. 10. The exhausts, enter the chamber between the discs, 91 and 92, where 91 is the rotating solid disc and 92 is stationary solid disc, as in FIG. 11. The exhausts can then exit through the actuator valve, 93, into the open atmosphere, as in FIG. 11. Note that the central axle output shaft, 12, passes through the supported bearing, 19, on the inner middle diameter of thick solid disc, 92, FIG. 11.

The rotational motion of solid disc, 91, is made possible by the rotating tubes, 25*y*, 24*w* and 25*z*, FIGS. 10 and 11. Thus, the delivery of oxygen and hydrogen gases into the rotational cylindrical fuel and the elimination of exhausts out of the rotational cylindrical fuel system are so accomplished in the aforementioned schematics.

Figure 9B:
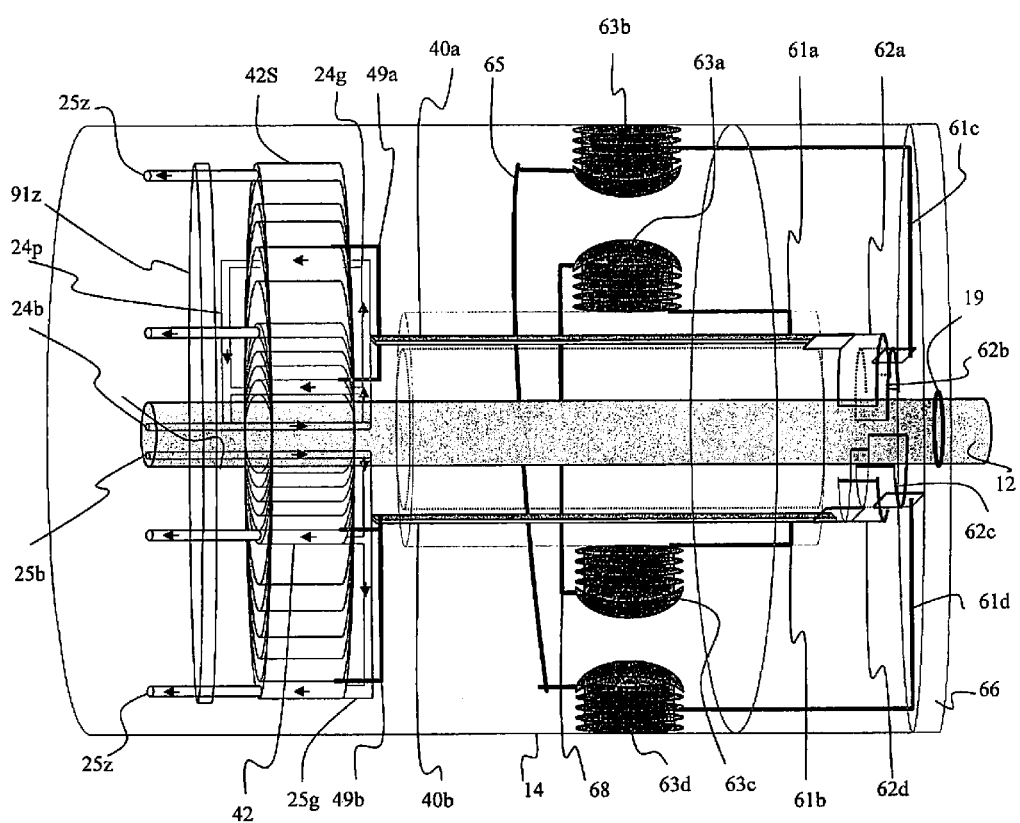
FIG. 9*b* A rotational cylindrical fuel cell motor, same as FIG. 7, however, these cylindrical fuel cells are on top of each other, and arranged in a parallel fashion with respect to the central output shaft, and with water vapor exhaust tubular conduits held by a stabilizing solid disc as they emanate out from the cylindrical fuel cells. The armature electromagnet winding poles, commutator, stator and stator electromagnet winding poles, are all categorically set apart from the cylindrical fuel cells along the length of central output shaft.

Another modification to the rotational cylindrical fuel cells is demonstrated in FIG. 9*b*, wherein, two specifics changes are made with respect to FIG. 8. The first change is the addition of a concentrically arranged rotational fuel cell stack around the central output shaft, 12, FIG. 9*b*. And the second change is the placement of electromagnetic winding poles, 63*a*, 63*b*, 63*c* and 63*d*, apparatus separate but adjacent to the rotational concentric cylindrical fuel cell stacks, as shown in FIG. 9*b*, instead of top and bottom vertically arranged attachments of the electromagnetic poles and rotational fuel cells, respectively, as in FIG. 8.

The operational function of FIG. 9*b* fuel cell motor is based on the same principles as in, FIG. 3*a*, and FIG. 8, where, the hydrogen gas comes from the storage apparatus of FIG. 4 or FIG. 10, and enters the tube, 24*b*, of FIG. 9*b*. The hydrogen gas journeys via tube, 24*g*, into the anode side of the concentrically situated one on top of another and rotationally capable cylindrical fuel cells, 42 and 42S. At the anode end of, 42 and 42S, the hydrogen gas is catalyzed into electrons and protons and the produced electric current makes its way, into the hard rotationally capable wire, 49*a*, to enter into the current collector, 40*a*, as the hydrogen protons journey toward the cathode end of the cylindrical fuel cells where the oxygen gas molecules are waiting.

Any unused hydrogen gas at the anode side of the concentric cylindrical fuel cells, 42 and 42S, is channeled back into the tube, 24*b*, to be reused by the anode side of the fuel cells, via the conduit, 24*p*, as in FIG. 9*b*. Meanwhile, the oxygen gas can also emanate from the designed storage apparatus of FIG. 5 and FIG. 10, and made to enter the conduit, 25*b*, of FIG. 9*b*. The oxygen gas then journeys into tube, 25*g*, which is connected to the cathode side of the concentrically stacked rotational cylindrical fuel cells, 42 and 42S, FIG. 9*b*. At the cathode end of, 42 and 42S, the oxygen molecule combines with the transmigrating hydrogen protons from the anode and the returning electrons from, 40*b*, (through the hard rotating wire, 49*b*), to form water vapor, FIG. 9*b*. The water vapor is channeled out through four tubes, 25*z*, to the outside or into the apparatus set up of FIG. 6.

In FIG. 6, the water vapor empties into the stationary chamber, 58, and subsequently, the vapor is channeled to run a turbine or fan attached to the main output shaft, 12. Note that a solid disc, 91*z*, which is permanently affixed to output shaft and to the four tubular conduits, 25*z*, holds these tubes together to provide them with stability when these tubes, 25*z*, and the rotational concentric cylindrical fuel cell stack, 42 and 42S, all rotate with the output shaft, 12, FIG. 9*b*. The entire tube system (24 and 25) could also have valves placed inside them or can be made to have one way valves which regulates the flow of gasses and exhausts that could make for an efficient fuel cell motor system.

The rotation of the concentrically stacked cylindrical fuel cell stack, 42 and 42S, is made possible by the electricity generated by the fuel cells which is channeled into the rotationally capable hard wire, 49*a*, and then into the current collector plate, 40*a*. From the current collector plate, 40*a*, as in a parallel circuit fashion of FIG. 3*a*, the electric current goes into wire, 61*a*, and into the commutator, 62*a*, FIG. 9*b*. Wire, 61*a*, transmits the current into pole, 63*a*, and from the pole, 63*a*, the DC current goes through wire, 68, into pole, 63*c*, which channels the electricity into wire, 61*b*, which forwards the current to the current collector retriever plate, 40*b*, FIG. 9*b*.

Meanwhile, the current in commutator, 62*a*, goes through the electricity conducting brushes into the stator, 62*b*, then into stationary wire, 61*c*, then into electromagnetic stator pole, 63*b*, then travels into the stationary wire, 65, which directs the electric current into pole, 63*d*, which relays the current into stationary wire, 61*d*, which brings it back to the stator and the electricity conducting brushes, 62*c*, which discharges into the commutator, 62*d*, and thus closing the circuit with the current going into the metallic current retriever plate, 40*b*, FIG. 9*b*.

Again, this circuitry is the same as the one in FIG. 3*a*, and FIG. 8. Henceforth, when the fuel reactants hydrogen and oxygen are made available to the concentrically arranged cylindrical fuel cell stacks, the electric current generated causes repeated generation of the same polarity repulsive magnetic fields between poles, 63*a* and 63*b*, 63*a* and 63*d*, as well as, 63*c* and 63*d*, 63*c* and 63*b*, which yields to the cyclic rotation of the central output shaft, 12, FIG. 9b. The cyclic rotation of the output shaft, 12, causes the attached concentric cylindrical fuel cells apparatus, 42 and 42S, to rotate as well.

Figure 12:
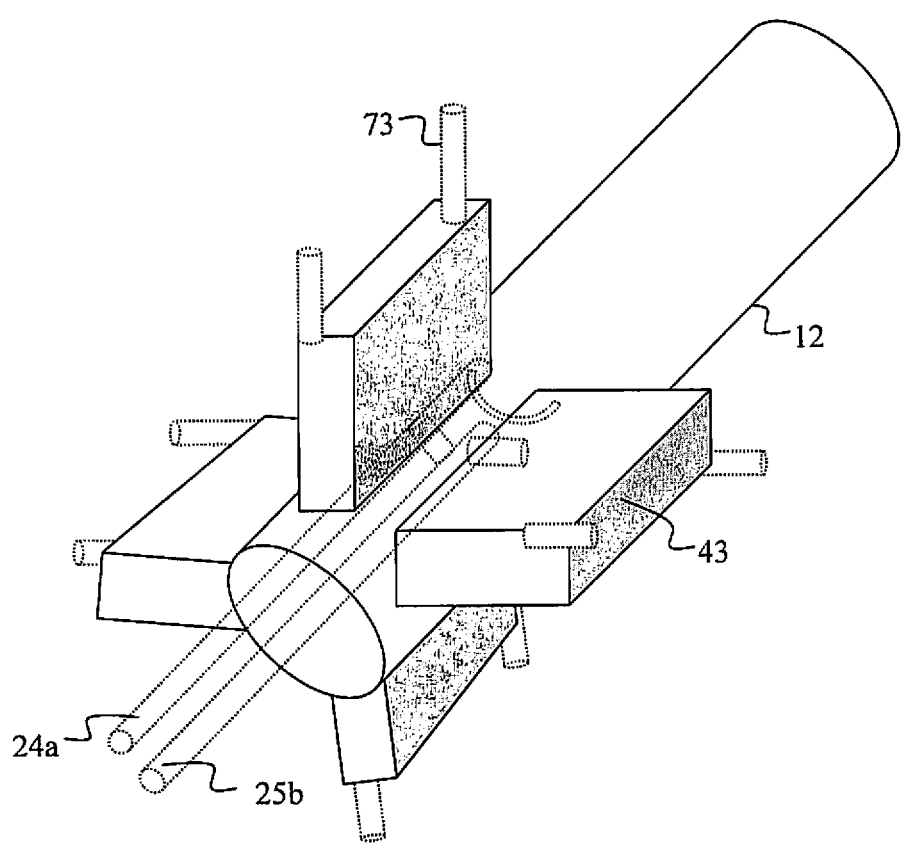
FIG. 12 A radially arranged rotational fuel cell placed on the central output shaft, wherein, the internal tubular conduits in the central output shaft is designed just as before to deliver hydrogen and oxygen to the radial fuel cells and the tubes on top of these radial fuel cells allows for the elimination of exhausts, like water vapor.

Another variation of the rotational discoid fuel cell of FIGS. 1, 2, 3, and 4, are the design configuration illustrated in FIG. 12, which comprises of radial placed rotational fuel cell stacks, 43, with respect to the central output shaft, 12. These radial fuel cell stacks, 43, are permanently anchored in a radial direction to the central output shaft, 12, and the hydrogen and oxygen gases are fed through the tubes, 24a and 25b, inside the output shaft, 12, to flow into these radial fuel cells, as in FIG. 12.

Note these radial fuel cells can be placed at any given angular positions with respect to the surface of the central output shaft, 12. For the delivery of hydrogen and oxygen, the gas tank apparatus is the same as the one illustrated in FIG. 4, FIG. 5, and FIG. 10. When hydrogen and oxygen come inside the radially situated fuel cells, 43, the reaction that takes place generates electricity which is channeled out through the axially (with respect to the output shaft, 12) placed wire, 74a, of FIG. 13. Very importantly, one can see that other than the radially situated rotational fuel cell stacks, 43, the rest of the apparatus set up for this type of fuel cell motor is exactly the same as one for the discoid fuel cell motor FIG. 3a or FIG. 3b, or, the cylindrical fuel cell motor, FIG. 8 (and even FIG. 9b).

Figure 13:
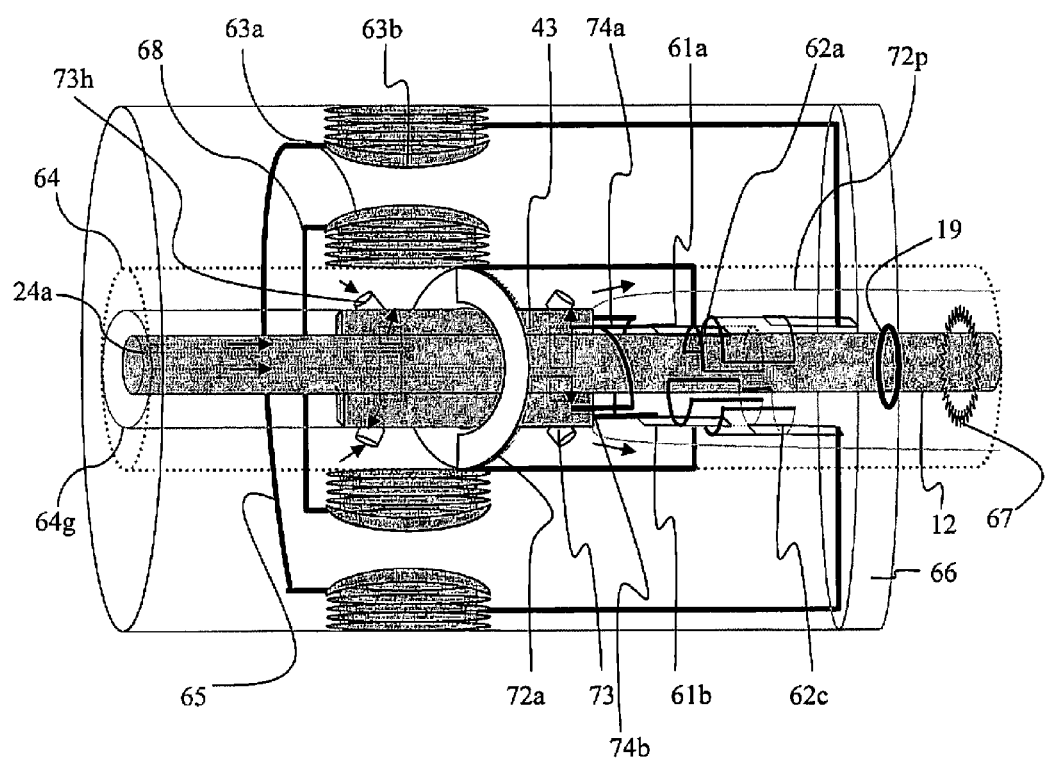
FIG. 13 Shown is the radially arranged (with respect to the central output shaft) rotational fuel cell motor with a central solid disc shaped barrier, so designed, to help contain hydrogen gas into the anode side of the radial fuel cells, wherein, the tubular conduit system inside the output shaft is not necessarily needed, and the elimination of the exhausts, like water vapor, air or unused oxygen from the other side of the solid disc barrier can occur. Also shown are the hard rotating wires, commutator, stator, armature poles, stator poles, bearings and the solid hollow parabolic like entity.

Again, the electricity coming from all rotational radial fuel cell converges onto the wire, 74a, of FIG. 13. And current collecting wire, 74a, transfers electricity in a parallel fashion to the electromagnetic pole, 63a, and to the commutator, 62a, at the same time, as in FIG. 13. Electricity travels onto the electricity conducting brushes and stator, 62b, as in FIG. 13, to supply the stator pole, 63b. Note that a series circuit instead of parallel circuitry for this rotational radial fuel cell motor can easily be made.

Again, like the discoid rotational fuel cell motor, and the cylindrical rotational fuel cell motor, the current from the radial fuel cell motor, generates the same repelling magnetic polarity between poles, 63a and 63b, thus rendering a rotational torque onto the free armature pole, 63a, and the attached central axle output shaft, 12, FIG. 13. Likewise the same repelling magnetic field polarity is created between rotational armature pole, 63c, and the stationary stator pole, 63d, yielding another rotational torque onto the free armature pole, 63c, and the central axle output shaft, 12, of FIG. 13. Henceforth, a rotational torque exerted onto the central output shaft, 12, is the process that repeats again and again so long as fuels (hydrogen and oxygen) are present to generate electricity. Note that the returning current through pole, 63c, and the commutator, 62d, merge into the hard wire, 74b, which returns the current back to the cathode side of the rotational radial fuel cell stack, FIG. 13.

In the radially arranged rotational fuel cell stack, the exhausts, water vapor, air, and unused oxygen comes out of tube, 73, which by the way is rotating together with the radial fuel cell apparatus, 43, as in FIG. 12 and FIG. 13. The water vapor is channeled out by the placement of three constraints; first, the solid disc shaped barrier (made from plastic or metal), 72a, that seals midway around the perpendicular length of the radial fuel cell stack, 43, then the hard conical shaped parabolic entity, 72p, (made from hard plastic or metal), and finally, the hollow cylindrical entity, 64, (that glues the rotational radial fuel cells to the armature poles, 63a and 63c, adjoined on top); so the water vapor, air and unused oxygen escapes into the outside atmosphere preventing water vapor from interacting with commutator, stator and the wires, of FIG. 13. The vapor could also be channeled into the schematic configuration of FIG. 6.

It is also possible that the hydrogen gas conduit, 24a, can be eliminated and instead, the hydrogen gas coming from a hydrogen tank of FIG. 10, can directly be supplied into the chamber defined by the cylinder, 64, another supporting cylindrical entity, 64g, and the solid rotating disc barrier, 72a, of FIG. 13. In this case the tube, 25w, of FIG. 10, can just be a hole rather than a lengthy hollow tubular structure. The tubes, 73h, on the radial fuel cells and the constraint set by the cylindrical encasings, 64, 64g, and the barrier disc, 72a, carry hydrogen gas into the anode side of the rotational radial fuel cell, 43, to be consumed. And in this design the solid rotating disc, 72a, acts as a sealant preventing oxygen, air, and water vapor from interacting with hydrogen gas present on the other side of the barrier, 72a, and they are always kept separate.

Figure 14:
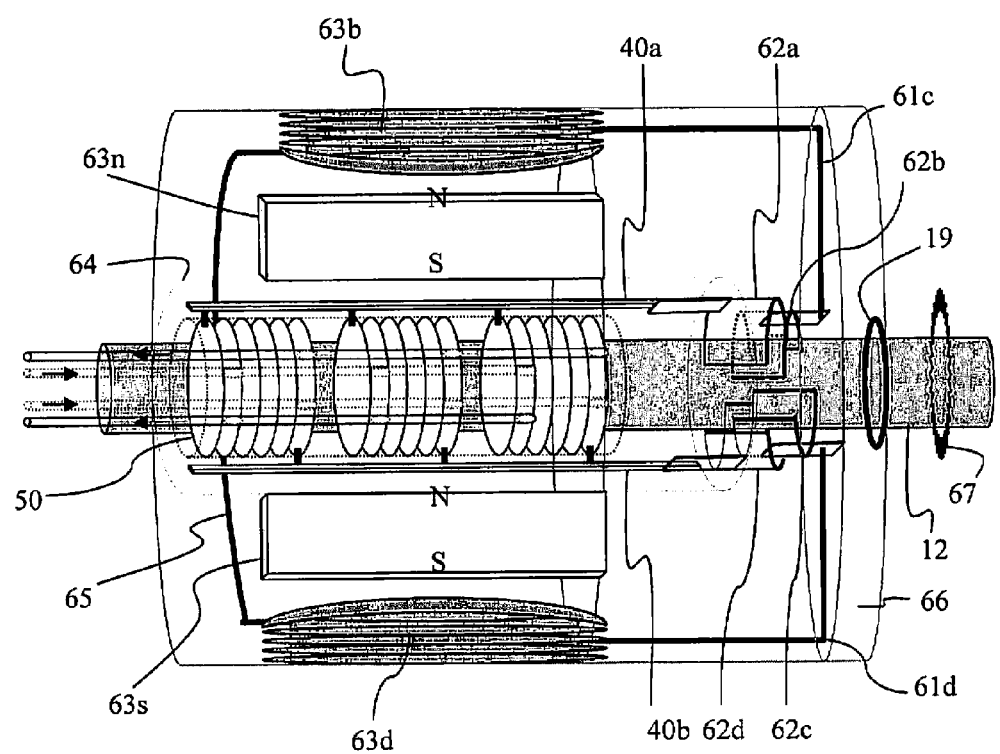
FIG. 14 Shown are a set of permanent magnets mounted in place of the electromagnet armature poles on the discoid rotational fuel cell of FIG. 3*a*, (note that a cylindrical or a radial fuel cell stack could also be in place of the discoid fuel cell).

In another adaptation of the device set up of FIG. 3a (or even FIG. 8, 9b, 13) the electromagnetic pole windings, 63a and 63b, can be replaced by the permanent magnet, 63n and 63b, which is attached to the central output shaft, 12, as shown in FIG. 14. Herein, the electric current generated by the rotational discoid shaped fuel cell stacks, 50, is channeled via, 40a, directly into the commutator, 61a, then into the electricity conducting brush and stator, 62b, travelling into the pole, 63b, and, then, through the stationary wire, 65, into the other stationary electromagnetic stator pole, 63d, and finally the current returns via wire, 61d, back to the stator, 62c, and commutator, 61d, and, to the current retriever plate, 40b, to finally end up onto the cathode side of the rotational fuel cells, thus, forming a closed circuit, as in FIG. 14. Again in this configuration same polarity congruent but repelling magnetic force fields are created between the rotational permanent magnets, 63n and 63b, and the electromagnetic stator pole windings, 63b and 63d; in a cyclic way, exerting a rotational torque on the freely movable permanent magnets, 63n and 63b; which drives the affixed central output shaft, 12, to experience rotational motion in a continuous sustained way, so long as the fuels (hydrogen and oxygen) are available to generate electricity, FIG. 14.

Figure 15:
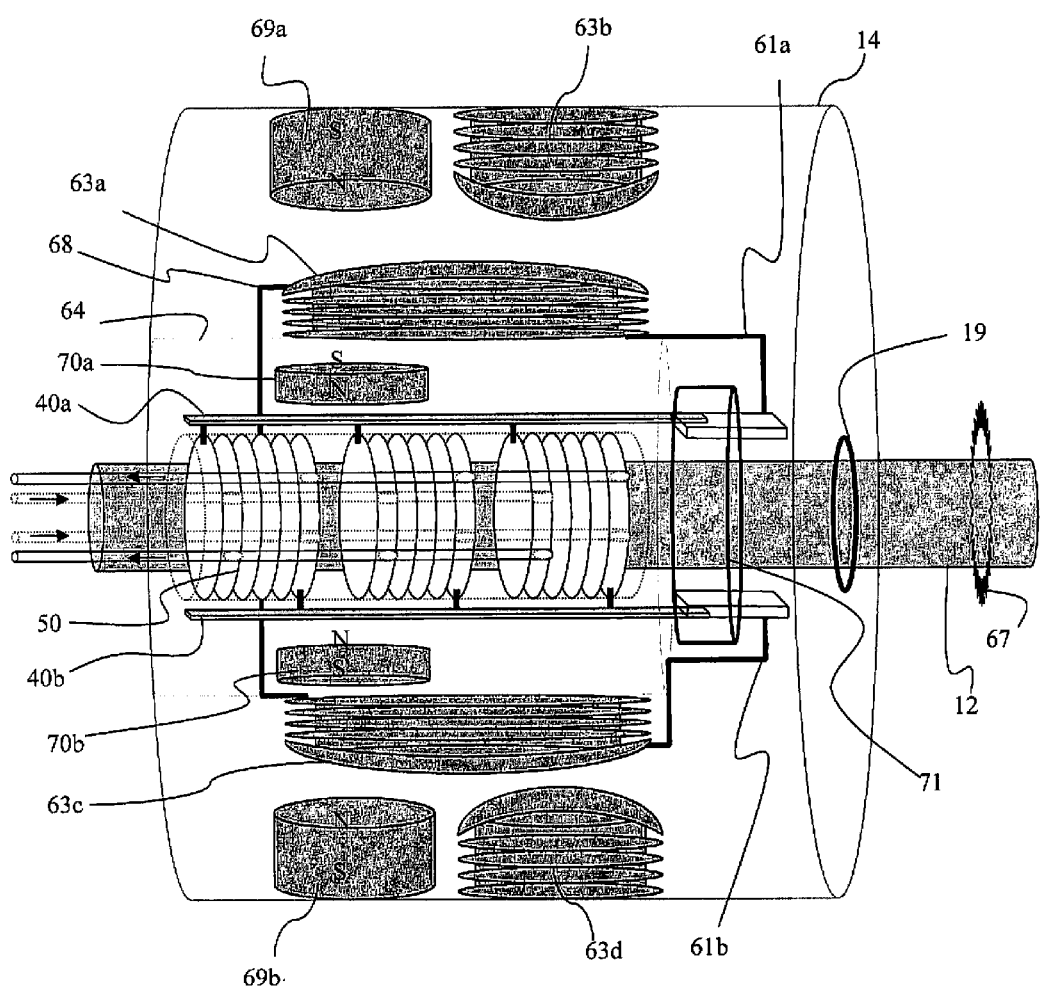
FIG. 15 Illustrated, is a rotationally capable Inverter, (that changes DC to AC electric current), that is in place of all three entities namely, the commutator, electricity conducting brushes, and stator, of FIG. 3*a*. Additionally, shown are the permanent magnets one placed between the armature pole and the fuel cell (so these magnets are rotating); and another set of permanent magnets are stationary in place of the stator electromagnet poles. Also shown are the schematic drawings of the stator electromagnet pole windings without any electrical connectivity. These designs makes for a brushless fuel cell motor or a fuel cell induction motor.

Alternatively, as in FIG. 15, a fuel cell motor design is so illustrated where the permanent magnets, 69a, 69b, are stationary in place of stator poles, 63b, 63d; and the commutator, 62a, 62d, the electricity conducting brushes, and the stator, 62b, 62c, are replaced by a single Inverter, 71. A permanent magnet, 70a, placed between the armature pole, 63a, and the current collector, 40a; and another permanent magnet, 70b, is placed between the armature pole, 63c, and the current retriever plate, 40b, FIG. 15. The permanent magnet, 70a, 70b, and rotational fuel cells, 50, (or, 43, or, 42) as well as central axle output shaft, 12, and the armature electromagnetic pole, 63a, 63c, are all housed tightly and strongly inside the encasing, 64, to form a single unit entity, FIG. 15.

In FIG. 15, the fixation of a novel cylindrically shaped rotationally capable, Inverter, 71, (a device that converts DC to AC electric current), around the central output shaft, 12, whose input electric current comes from plate, 40a, and the output current leaves into, 40b, makes for another design for the fuel cell motor. When the current flows from the anode of the fuel cell into the current collector, 40a, it, then goes into the negative side of the DC to AC Inverter, 71, and then into the armature pole winding, 63a, via the wire, 61a, of FIG. 15.

The variation of the current or the delivery of AC current into the pole, 63a, yields a magnetic polarity at some point in time which is the same repelling force between armature pole, 63a, and the permanent magnet, 69a, henceforth, resulting in a mechanical rotational torque onto the armature pole, 63a, and the central output shaft, 12. The travelling electric current journeys from the armature pole, 63a, into the electromagnetic pole winding, 63c, via the wire, 68, and then enters the positive side of the DC to AC rotational Inverter, 71, from whence the current ends up on the current retriever plate, 40*b*, and, finally transmitted back into the cathode side of the rotational fuel cells, 50 (or, 43, or, 42), to complete the circuit.

The arrival of electricity in the armature pole, 63*c*, produces the same polarity repelling magnetic force fields at some point in time with respect to the permanent magnet, 69*b*, which again yields a rotational mechanical torque on the free armature pole, 63*c*, and the output shaft, 12. So long as fuels are present and electric current generated, the aforementioned cycle of magnetic repulsion is repeated again and again between armature poles, 63*a*, 63*c*, and the magnets, 69*a*, 69*b*, yielding to a sustained rotational motion of the output shaft, 12. Replacing the Inverter, 71, with one or many capacitors can readily delay, and attenuate the DC current in the armature electromagnetic winding poles, 63*a* and 63*c*, in a cyclic manner oscillating from some maximum strength of the current to zero, back and forth, thus resulting in the same electromagnetic phenomenon as provided by the Inverter, 71, and ultimately leading to the same mechanical rotational motion of the central output shaft, 12.

On the other hand, instead of the magnets, 69*a* and 69*b*, (or, 70*a* & 70*b*), one can keep the original stator electromagnetic poles, 63*b* and 63*d*, in place, FIG. 15. In this configuration of FIG. 15, where the poles, 63*b* and 63*d*, are left in their original position, without attachments to any current carrying wires and as stand alone poles, yields to make for an induction type fuel cell motor. In this situation, the alternating and attenuating currents in the armature poles, 63*a* and 63*c*, due to their connection with the Inverter, 71, invokes an electromagnetic induction on the stationary stand alone electromagnetic poles, 63*b* and 63*d*; and by Faraday Law of electromagnetic induction, a reactive reciprocal electromagnetic force on the armature poles, 63*a* and 63*c*, is produced; which ultimately, leads to a mechanical rotational motion of the freely movable armature poles, 63*a* and 63*c*, conjoined fuel cells and the central output shaft, 12, FIG. 15.

More so, with the Inverter, 71, in place of the commutator, 62*a*, 62*d*, and the stator, 62*b*, 62*c*, makes for a brushless fuel cell motor. In FIG. 15, the stator electromagnetic pole windings, 63*b* and 63*d*, can additionally have their electricity supplied independently by another conventional stationary fuel cell battery, or, a regular battery, or, solar cell, or any other electricity producing sources, for the purposes of electromagnetic induction on the armature poles, 63*a* and 63*c*, whose electricity would be supplied by the rotating fuel cells, making for another powerful configuration of the fuel cell motor design.

Figure 16:
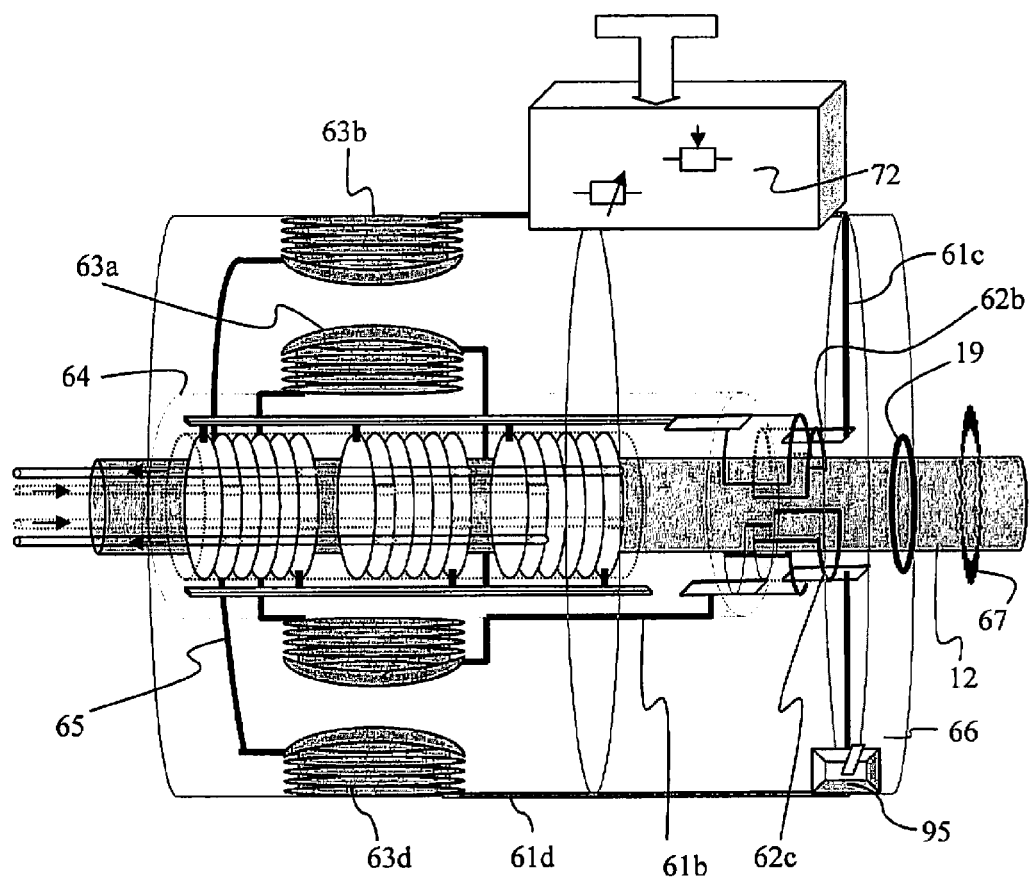
FIG. 16 Shown is a variable resistor placed in the fuel cell motor circuit to control the speed of rotation of the central axle output shaft. Moreover, a simple switch is also shown which can divert electric current from the rotating fuel cell to a rechargeable battery, which, can also alter and adjust the rotational speed of the central output shaft.

Now, in order to control the deceleration and acceleration of the rotational motion of the output shaft, 12, of FIG. 3*b*, a variable resistor (potentiometer, rheostat), 72, could be added between the stator, 62*b*, and the stator electromagnetic pole, 63*b*, along the wire, 61*c*, as shown in FIG. 16. Moreover, the variable resistor, 72, can be placed anywhere along the stator part of the circuitry in FIGS. 3*a*, 3*b*, 9*b*, 8, 13, 14, 15, 19 and 20. Manipulation of this variable resistor, 72, causes current variations in the fuel cell motor, which leads to halting the rotational torque on the output shaft, 12, of the fuel cell motor, or, allowing a total un-impeded rotational motion to occur.

Alternatively, a simple switch, 95, in-between the stator pole, 63*d*, and stator, 62*c*, along the wire, 61*d*, near the stator stationary solid disc, 66, can also be added. This switch, 95, when turned on, diverts current from the fuel cell motor to charge a battery, bringing the rotational motion of output shaft, 12, of fuel cell motor to a halt. Also the switch, 95, can be calibrated, such that by manipulating the switch, partial current can be diverted into a rechargeable battery and rest of the electricity can be made to go into running the fuel cell motor, thereby, controlling the rotational speed RPM of the motor.

Figure 17:
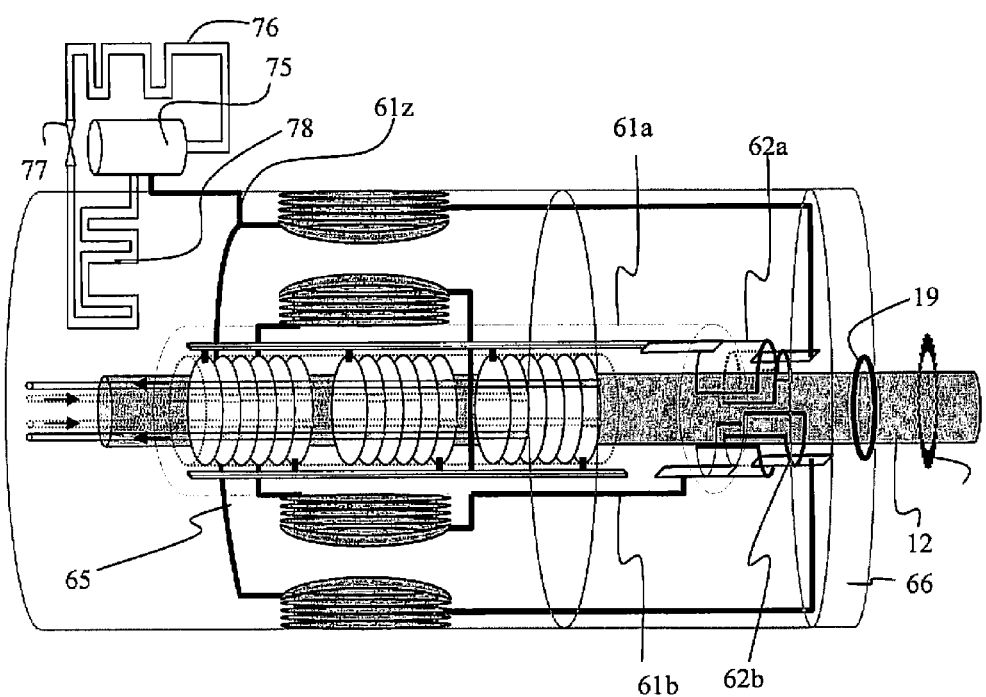
FIG. 17 Shown is a refrigeration cooling system placed inside the fuel cell motor that diminishes the electric current impedance by taking away excess heat generated within the fuel cell motor system. Note that the electricity generated by the rotating fuel cells can be partially channeled into the refrigeration system (mainly the compressor).

To further increase the efficiency of the fuel cell motor, cooling the sometimes over heated rotational armature poles, 63*a* and 63*c*, augment electrical conductivity and magnetic field generation, within the fuel cell motor system. So, a compressor, 75, hooked up to a battery, 53, and to an outside heat exchanger tube, 76, and to an expansion valve, 77, and to another heat exchange pipe, 78, all attached together making for a cooling system, as shown in FIG. 17; can be attached to the fuel cell motor of FIG. 3*b*, (as well as to the schematics of FIGS. 9*b*, 8, 13, 14, 15, 19 and 20). Indeed, part of the electric current from the rotating fuel cell armature can be diverted into the compressor, 75, via the wire, 61*z*, to power the cooling system to cool the fuel cell motor, FIG. 17.

Furthermore, to reverse the rotational motion of the central output shaft, 12, from a clockwise to the counterclockwise direction, or vice versa, in the fuel cell motor designs of FIGS. 3*a*, 3*b*, 9*b*, 8, 13, 14, 15, 19 and 20, then, simply, the electric current instead of going from the current collector plate, 40*a*, into the commutator, 62*a*, needs to be reversed and channeled into the commutator, 62*d*, of FIGS. 3*a*, 3*b*, 9*b*, 8, 13, 14, 15, 19 and 20. And at the same time the returning electric current instead of going from commutator, 62*d*, to current retriever plate, 40*b*, needs to go from commutator, 62*a*, into the current retriever plate, 40*b*, of FIGS. 3*a*, 3*b*, 9*b*, 8, 13, 14, 15, 19 and 20. The aforementioned mechanism can be accomplished by introducing a solid thickness disc, 84, (made from hard plastic or dielectric material) permanently affixed to the central output shaft, 12, and situated (perpendicular to the shaft, 12) in between the current collectors, 40*a*, 40*b*, and the commutators, 62*a*, 62*d*. The current collectors, 40*a*, 40*b*, the solid disc, 84, and the commutators, 62*a*, 62*d*, are all contiguous structure, articulating with each other, and rotating with the shaft, 12, during fuel cell motor function.

Figure 18A:
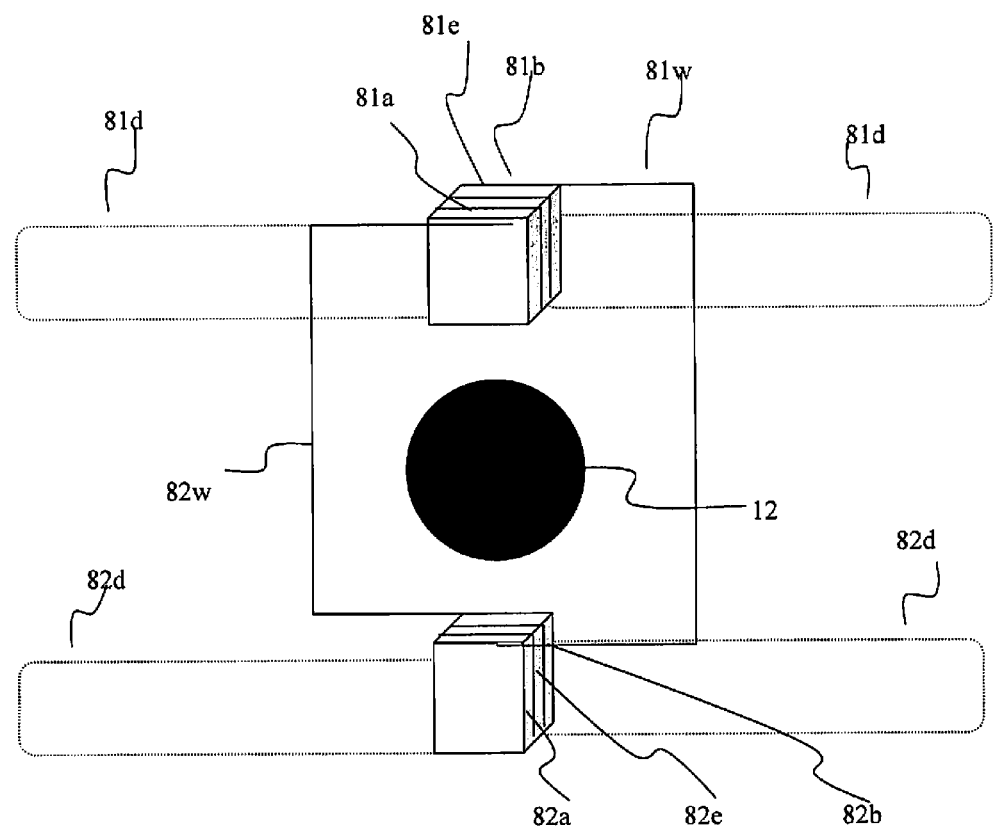
FIG. 18*a* Shown is a component of a switch apparatus that allows for the reversal of current going in-between the current collector and retrieval plates and the commutators, of FIG. 3*a*. Two separate dielectric materials is affixed and sandwich between two small metallic plates, and one side of the metallic plate of one dielectric sandwich cube is electrically connected to the opposite side of the other dielectric sandwich cube by a flexible wire, as shown in the schematic diagram. The dielectric cube sandwiches have flexible flaps joined around itself and these flaps are cross sectionally embedded into a full thickness solid disc of FIG. 18*c*.
Figure 18B:
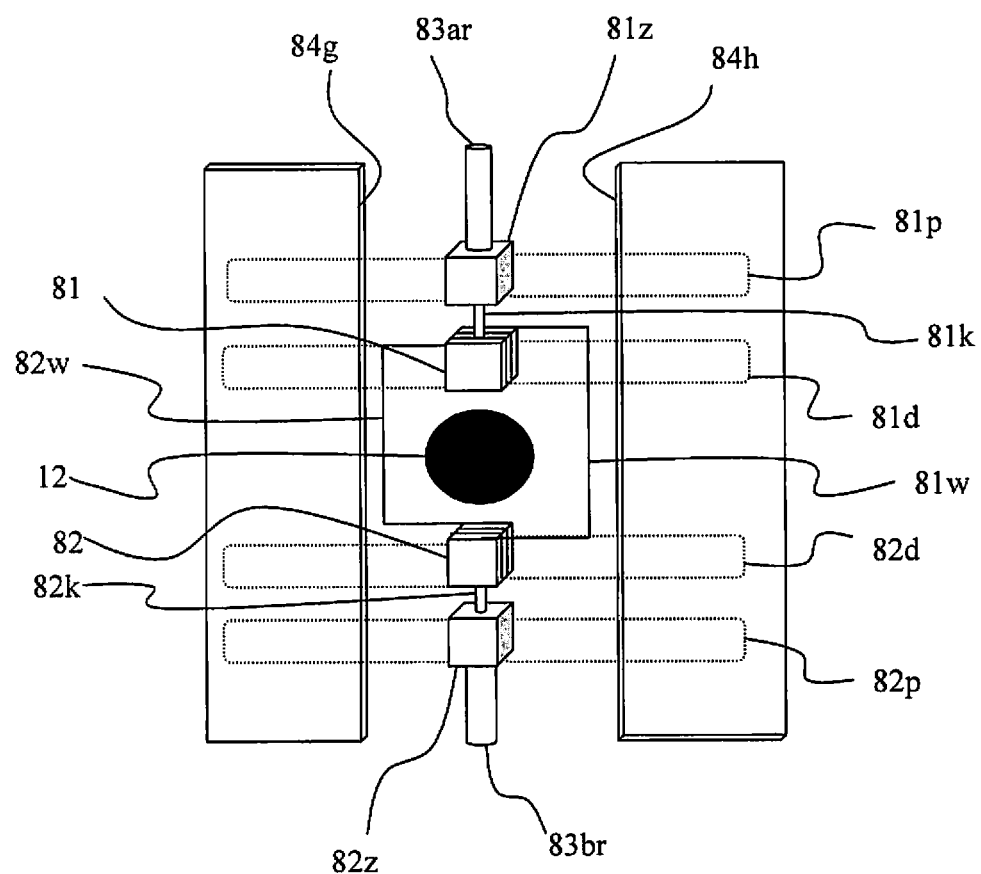
FIG. 18*b* Shown are the dielectric sandwiches with their flaps placed inside a cross sectional slit like groove of the full thickness solid disc that is affixed to the central output shaft and lies between the current collector plates and the commutators. Attached to these dielectric sandwiches are another set of small cube shaped metallic pieces that conducts electricity from the current collector plates to the commutators in a straight forward way. The dielectric sandwiches when slid into the position of the small metallic cube entities cause the electricity flowing into and out of the commutators to reverse direction.
Figure 18C:
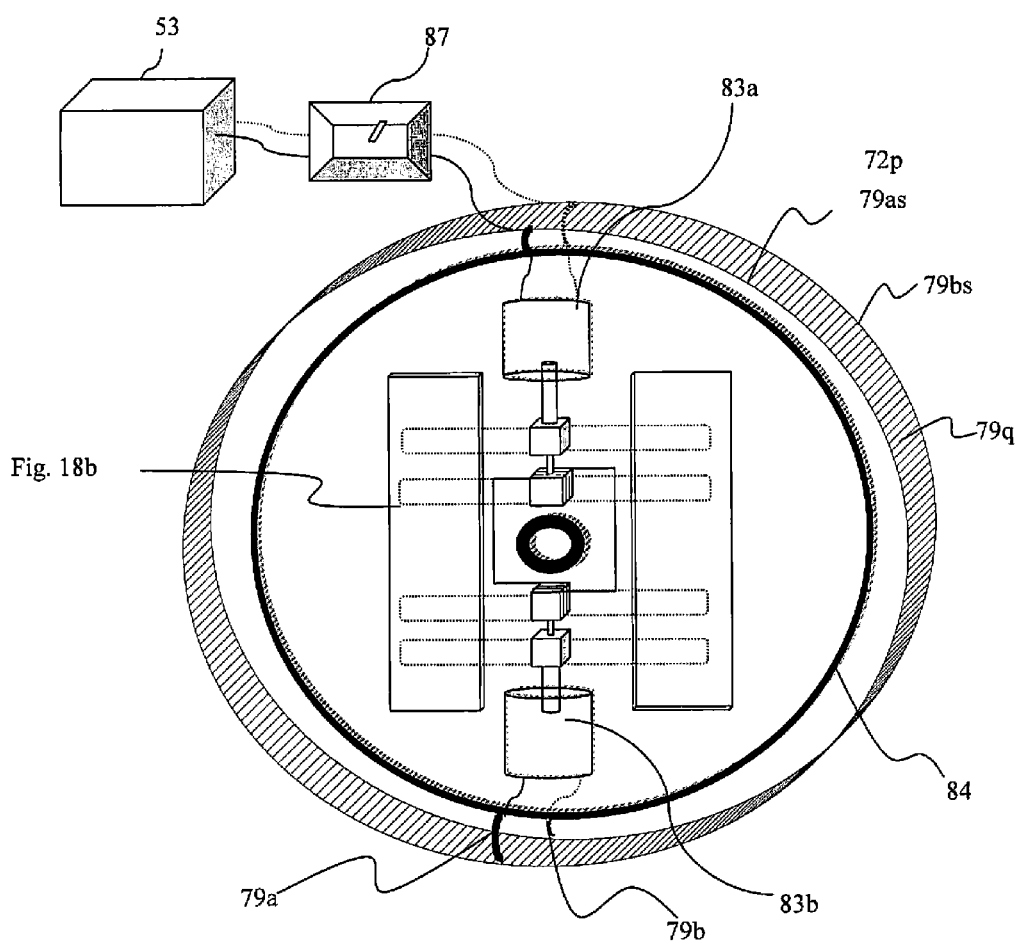
FIG. 18*c* Shown is the embodiment of the reversal switch, wherein, the solid thickness disc entity which is affixed to the central output shaft and that lies between, current collector plates and the commutators (of FIG. 3*a*), contains the apparatus of FIG. 18*b*. The apparatus of FIG. 18*b* is joined to the shaft of two sets of solenoids that sit close to the outer rim of the solid disc. The solenoids rotates with the attached solid disc and has a negative and positive metallic terminals built along the inner circumferential surface of the full thickness solid disc. There is a stationary outer rim with stationary electricity conducting brushes with accompanying negative and positive terminals, which is connected to a simple switch and battery. More importantly the stationary electricity conducting brushes constantly articulates with the solid disc switch apparatus and conducts electricity into the solenoids. When the switch is turned on, the current in the solenoids pulls the dielectric cubes into the position of the original bare metallic cube entities, which reverses the electric current flow between the two commutators. The reversing of current flow inside the commutators leads to changes in the rotational motion of the central output shaft from clockwise to counterclockwise direction or vice versa.

In FIG. 18*c*, the solid disc, 84, has a central hole where the central output axle, 12, is affixed and more importantly around this central hole there is an embedded apparatus set up that is shown in FIG. 18*b*. This apparatus is a kind of a rotating switch device which accomplishes the task of reversing and re-reversing the direction of the rotational motion of the central output shaft, 12. The rotating switch, in essence, is depicted in FIG. 18*a*; wherein, a small solid metallic cube shaped box entity, 81, 82, (which conducts electric current between commutator, 62*a*, 62*d*, and the current collector, 40*a*, 40*b*) are each divided into three parts. The cube, 81, has a solid non-conducting dielectric material entity, 81*e*, affixed and sandwich between, two highly conductive metallic material entity, 81*a* and 81*b*, FIG. 18*a*.

Similarly, the small conductive entity, 82, has a non-conducting dielectric material entity, 82*e*, sandwich and affixed in-between two highly conductive entities, 82*a* and 82*b*, FIG. 18*a*. Next, a highly flexible yet strong conductive wire, 81*w*, 82*w*, attaches and electrically connects the small cube entities, 81 to 82, and vice versa, as in FIG. 18*a*. But note, that the wire, 82*w*, electrically connects, 81*a*, to, 82*b*, and the wire, 81*w*, connects, 81*b*, to, 82*a*, FIG. 18*a*; so that electric current could flow from current collector, 40*a*, into entity, 82*b*, through, 81*a* and 82*w*, and the returning current flows into, 82*a*, through 81*b* and 81*w*, which then reaches into the current collector retriever plate, 40*b*, FIG. 18*a*. The entities, 81, 82, have a small hard plastic wings or flaps, 81*d* and 82*d*, that are cross sectional pieces permanently attached on opposite sides of the cube entities, respectively, as in FIG. 18*a*. The flaps, 81*d*, 82*d*, reside inside the cross sectional slit like grooves, 84*g*, and 84*h*, of the solid thickness disc, 84, (see FIG. 18*b*, 18c); and these flaps allow constrained translational motion of the entities, 81, 82, along its prescribed length, along the radial direction of the solid thickness disc, 84, FIG. 18b.

Next, the entities, 81, 82, dielectric sandwiches, are attached via, small rod like connections (made from dielectric non-conducting material or plastic), 81k, 82k, to the entities, 81z, 82z, respectively, FIG. 18b. The entities, 81z and 82z, are highly conductive metallic pieces shaped like a small cube box, as in FIG. 18b. And the entities, 81z and 82z, have no diamagnetic material sandwiches or wires going between them, thus, these solid metallic cubes allow the electric current to flow un-impeded from one cross sectional side of the metallic box cube to the other side. These conducting small metallic cube boxes, 81z, 82z, are attached via small dielectric rods, 83ar, 83br, respectively, to the solenoids, 83a and 83b, FIG. 18c. These non-conducting rods, 83ar, 83br, (FIG. 18b and FIG. 18c), form the shaft of the solenoids, 83a, 83b, respectively. The entities, 81z and 82z, have their own flaps or wings, 81p and 82p, respectively. These flaps, 81p, 82p, reside inside the cross sectional slit grooves, 84g and 84h, to provide stability during the translational motion of the entities, 81z, 82z, (FIG. 18b and FIG. 18c), especially, during the rotational motion of disc, 84.

Now, the entire apparatus of FIG. 18a and FIG. 18b, is permanently attached and placed inside the cross sectional area of the solid thickness disc, 84, as in FIG. 18c. It is important to note that the small solid metallic cube boxes, 81z, 81 and 82, 82z, are freely movable along a constrained path inside the solid disc, 84, but that their motion is still controlled by the solenoids. And the translational motion of the small metallic solid cube box shaped entities, 81, 81z and 82, 82z, is caused by the affixed shaft of the solenoid, 83a and 83b, respectively, as in FIG. 18b, and FIG. 18c. The solenoids, 83a and 83b, are permanently attached to the solid thickness disc, 84, so, it rotates along with the disc and the output shaft, 12, as does the apparatus of FIG. 18b. Next, the input and output ends, which are a thin rim of circumferential metallic wire pieces residing on the circumference of the solid thickness disc, 84, provides for the electric current going into these rotating solenoids, 83a, 83b, via the articulation with the stationary electricity conducting brushes, 79a and 79b, as shown in FIG. 18c. These electricity conducting brushes, 79a, 79b, (which are the negative and positive electrical ends or vice versa) are attached to a stationary rim, 79q, FIG. 18c.

The circular stationary rim, 79q, has an input and output circular electrical outlet, (negative and positive ends), 79as and 79bs, (made from highly conductive metallic material), which are electrically connected to a battery, 53, with a switch, 87, in the middle, FIG. 18c. The stationary electricity conducting brushes, 79a, 79b, (with a positive and a negative circumferential arrangements), articulates with the positive output and negative input ends of the solenoids, 83a and 83b, in FIG. 18c. Note that the rim, 79q, is a stationary entity that lies in a cross sectional way between the current collector plates, 40a, 40b, and the commutators, 62a, 62d. Note, again, that the solenoids have circular metallic terminals circumnavigating the outer surface of the solid disc, 84, and articulating with the electricity conducting brushes, 79a, and 79b.

During the rotational motion of the output shaft, 12, which is synonymous with an operating fuel cell motor, the switch, 87, may be turned on, FIG. 18c. The on switch allows the electric current to flow from the battery, 53, (or from the fuel cell itself, not shown) into the electricity conducting brushes, 79a and 79b, and then into the solenoids, 83a and 83b. The solenoids, 83a, 83b, causes a robust pulling of the small metallic cube boxes, 81z and 82z, which pulls on the dielectric sandwich entities, 81 and 82; which results in the occupancy of 81, 82, in the same spatial position as the ones occupied by the metallic electricity conducting cubes, 81z and 82z, of FIG. 18c. What happens now is that the current from anode goes into the current collector plate, 40a, which goes into the conducting entity, 81a, which diverts the current through the flexible wire, 82w, into conducting entity, 82b, which conducts electricity to the opposite commutator, 62d, instead of the commutator, 62a, all due to the presence the diamagnetic materials, 81e, FIG. 81c. And the returning current automatically comes into commutator, 62a, and goes through small cube conducting entity, 81b, which diverts current through the flexible wire, 81w, into small conducting entity, 82a, which transfers electricity into the other current collector retriever plate, 40b, which delivers the current to the cathode side of the fuel cell motor, FIG. 18c.

Hence, the current going into the commutators, 62a, 62d, is reversed from before, which renders a reversal of the original rotational motion of the central output shaft, 12. When the switch, 87, is turned, off, the current in the electric brush, 79a, 79b, is discontinued and the solenoids, 83a, 83b, no longer provide a pulling force, and returns the small conducting metallic boxes, 81, 81z, and 82, and 82z, back to their original positions. The conducting entities, 81z and 82z, being brought back to its native position restores the flow of current from the current collector plate, 40a, to commutator, 62a, as well as return flow of current from the commutator, 62d, back into the current retriever plate, 40b. The restoration of the original electric current flow into the commutators, 62a, 62d, leads to the restoration of the original rotational motion for the central output shaft, 12, FIG. 18c.

Figure 19:
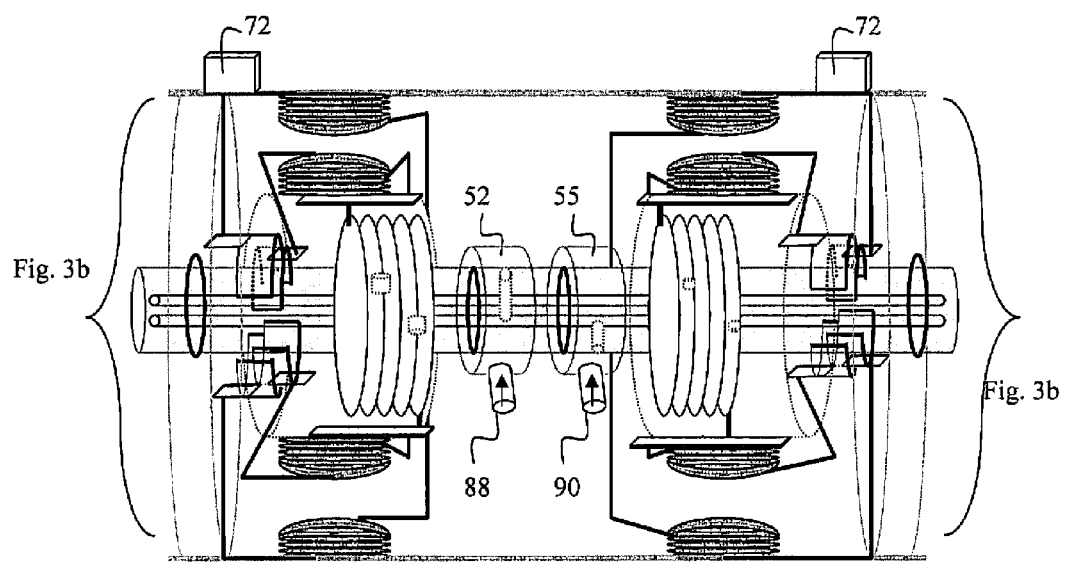
FIG. 19 Shown are the stationary hydrogen and oxygen gas chambers enveloping the middle of the central output shaft, wherein, the rotational fuel cells are located on either side of the gas chambers.

Another different configuration of the fuel cell motor is illustrated in FIG. 19. Herein, the design configuration of FIG. 3b, is modified such that the middle of the central output shaft, 12, articulates with two distinct stationary hollow cylindrical gas chambers, 52 and 55. These hollow cylindrical chambers have on their hollowed centers, the bearings, 19, on either ends. These bearings, 19, are made in such a way that it prevents leakage of gas (hydrogen or oxygen) that reside inside the gas chamber, 52 and 55, FIG. 19. These cylindrical gas chambers are strong, sturdy, and able to withstand high pressures; and are made from steel, or hard plastic, etc.

The bearings, 19, hold and provide support to the central output shaft, 12, which passes through these gas chambers, during stationary and rotational phase of the fuel cell motor function. Note that the hydrogen gas enters through tube, 88, into the gas chamber, 52, from a hydrogen storage tank, and oxygen or air enters through tube, 90, from a oxygen or air storage tank. From the chambers, 52 and 55, the gasses traverse through the conduits built inside the output shaft, 12, to reach the rotational fuel cells. Again, the availability of hydrogen and oxygen into the rotational fuel cell motor set up of FIG. 19, causes production of electric current that leads to the central output shaft, 12, to undergo rotational motion, and, hence manifests the essential function of the motor.

Figure 20:
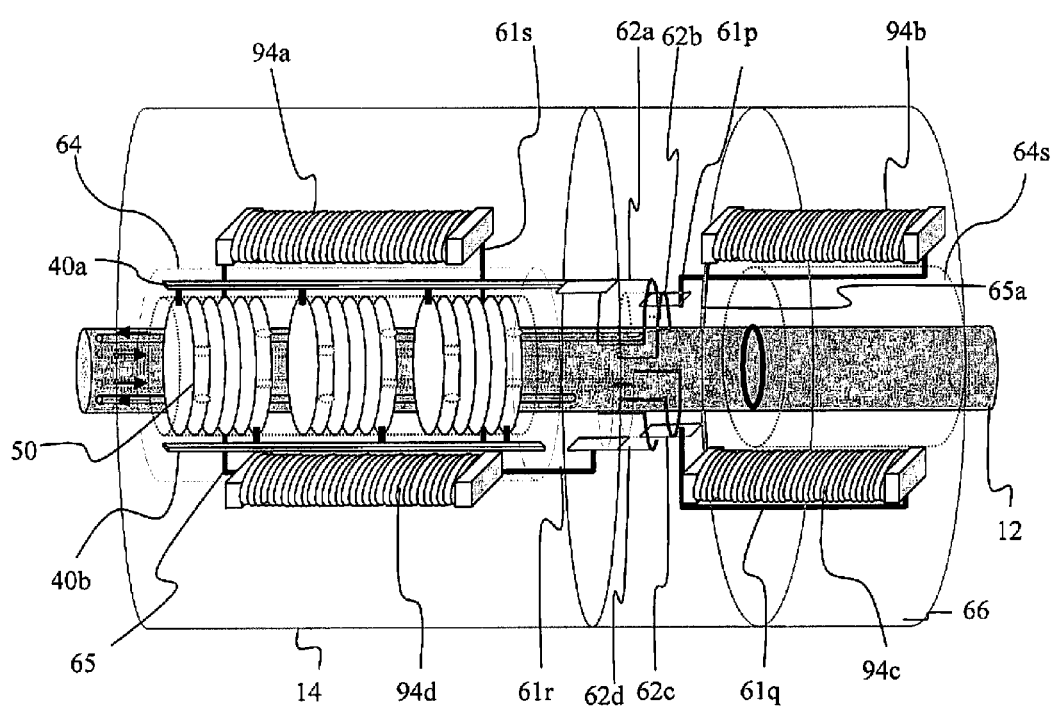
FIG. 20 Shown is a parallel electromagnetic pole fuel cell motor design, wherein, the apparatus set up is similar to fuel cell motor of FIG. 3*a*, except, that the two armature poles have their coils on the electromagnets wrapped in a parallel direction with respect to the central output shaft. Similarly, the stator poles has its electromagnet coils wrapped in a parallel direction with respect to the central output shaft. The stator electromagnetic pole sits on a stationary, sturdy and strong cylindrical encasing entity, on whose center is the articulating central output shaft that is supported by bearings during the shafts rotational motion. The generated magnetic fields between the armature pole and the stator pole are in a parallel direction with respect central output shaft.

One can also make use of parallel arranged magnetic force fields (instead of the perpendicular ones) with respect to the central output shaft, 12, axis, to generate rotational torque onto the said central output shaft, 12. As shown in FIG. 20, the armature pole coil windings, 94a and 94d, and stator pole electromagnet windings, 94b and 94c, are arranged along the axial (instead of perpendicular as in FIG. 3a, 3b, 9b, 8, 13, 14, 15) direction of the central output shaft, 12. In FIG. 20, the configured magnetic fields (that is generated from an electric current on the coils of the electromagnet), run in a parallel direction with respect to the axis of the central output shaft, 12, because of the axial (with respect to output shaft, 12) coiling arrangements of the armature and stator electromagnet poles.

When the fuel (hydrogen and oxygen) is supplied to the rotational fuel cells, 50, (or, 43, or, 42) the harnessed electric current flows in the following way: from the anode side of the fuel cell, the current, goes into the hard wires of the rotational anode, then into the current collector plate, 40a, then, into the rotational commutator, 62a, then, into the stationary electricity conducting brushes and stator, 62b, then, into the stationary wire, 61p, then, into the stationary parallel stator electromagnet pole coils, 94b, then, into the stationary wire, 65a, then, into the stationary parallel electromagnet pole winding, 94c, then, into stationary wire, 61q, then, back into stator and electricity conducting brushes, 62c, then, into rotational commutator, 62d, then, into the rotational wire, 61r, then, into the parallel rotational armature electromagnet pole winding, 94d, then, into the rotational wire, 65, which brings the electric current into armature pole, 94a, and then, the current exits into the rotating wire, 61s, from whence the current goes into current retriever plate, 40b, to finally end up into the cathode side of the of the rotational fuel cell, 50, (or, 42, or, 43), to complete the electrical circuit, FIG. 20.

It is readily evident that aforesaid is a description of a series type circuitry so designed that allows cyclic creation of an equivalent polarity and strength North-North and South-South magnetic field force between parallel electromagnet pole windings of the armature, 94a, 94d, and the stator, 94b, 94c, which always yields to a repulsive magnetic force, that causes a rotational torque onto the freely movable armature poles, 94a, 94d, and the affixed rotational fuel cell stacks, 50, (or, 42, or, 43,); and ultimately, causes the rotational motor action to manifest onto the central output shaft, 12, see FIG. 20.

Note that the armature poles, 94a, 94d, are attached to the dielectric cylindrical entity, 64, on its outside surface and attaches to the rotational fuel cells, 50, (or, 42, or, 43) on its inside surface. Similarly, the stator electromagnetic pole winding, 94b, 94c, are attached to the stationary dielectric cylindrical entity, 64s, which does not move or rotate, and has bearings that provides support to the inside resting or rotating central output shaft, 12, hence, helping in accomplishing the motor action for the fuel cell motor. Moreover, permanent magnets, stator electromagnets without electrical connections, an Inverter, can all be configured into the parallel arranged electromagnet fuel cell motor.

Now, any number of different types of fuel cells like, Solid Oxide Fuel Cell (SOFC), Alkaline Fuel Cell (AFC), Molten-Carbonate Fuel Cell (MCFC), Phosphoric-Acid Fuel Cell (PAFC), and Direct-Methanol Fuel Cell (DMFC), or any other fuel cell entities, can be made into a discoid shaped fuel cell motor, or cylindrical fuel cell motor, or radial fuel cell motor, etc., all of which experiences rotational motion as illustrated in the figures. Sometimes it may be necessary to have the rotational fuel cells operate at a higher temperature, so, a stationary hollow cylindrical heater, 51, (with heating coils inside) surrounding the central axle, 12, as mentioned before, in FIG. 2, can be added to make these types of fuel cell functional.

Ultimately, the central advantage in the embodiment of these novel rotational fuel cell configurations, (radial, discoid, and cylindrical), is that the rotational motion of the fuel cells (as it is affixed to an output shaft), results in the reactants, hydrogen and oxygen molecular moieties to react thoroughly with their respective catalyst within the fuel cell membrane to yield a highly efficient reaction process. Thus, the reactants are able to react at low pressure and low temperature conditions, when compared to a conventional fuel cell battery system, where, higher pressure or temperature conditions may be required for the reaction process to occur.

The efficiency of energy and current generation due to optimal mixing of the reactants gives the fuel cell motor an edge against other fuel cell battery conjoined to a motor design systems. The other advantage in accordance with embodiments described herein is that, tremendous amount of space is saved as compared to the fuel cell battery powering any given attached motor system, and indeed, this type of rotating fuel cell motor affords for a compact motor design. The efficiency of the fuel cell motor is further enhanced as the magnetic fields that are created in close proximity to oxygen gas which is a paramagnetic substance augments its reaction capacity (as mentioned in some studies). And the rotational motion of the fuel cells does not damage the fuel cells, because the fuel cells are securely and tightly encased. Indeed a uni-body construction of the rotating fuel cells, around the central axle output shaft, renders the fuel cell stacks impervious to destruction during the rotational motion, even at high rpm speeds.

The increased rate of reaction and energy efficiency, in the embodiment of this novel rotational fuel cell motor, obviates the need for the presence of greater quantities of more expensive catalyst material like platinum and lends itself to a cost effective device. Last but not least, the rotational motion of the central output shaft, 12, in this embodiment of the rotational fuel cell motor can be made to run a car or any other automobile or any where motor functions are required.

Galvanic Cell or Battery Motor

Figure 21A:
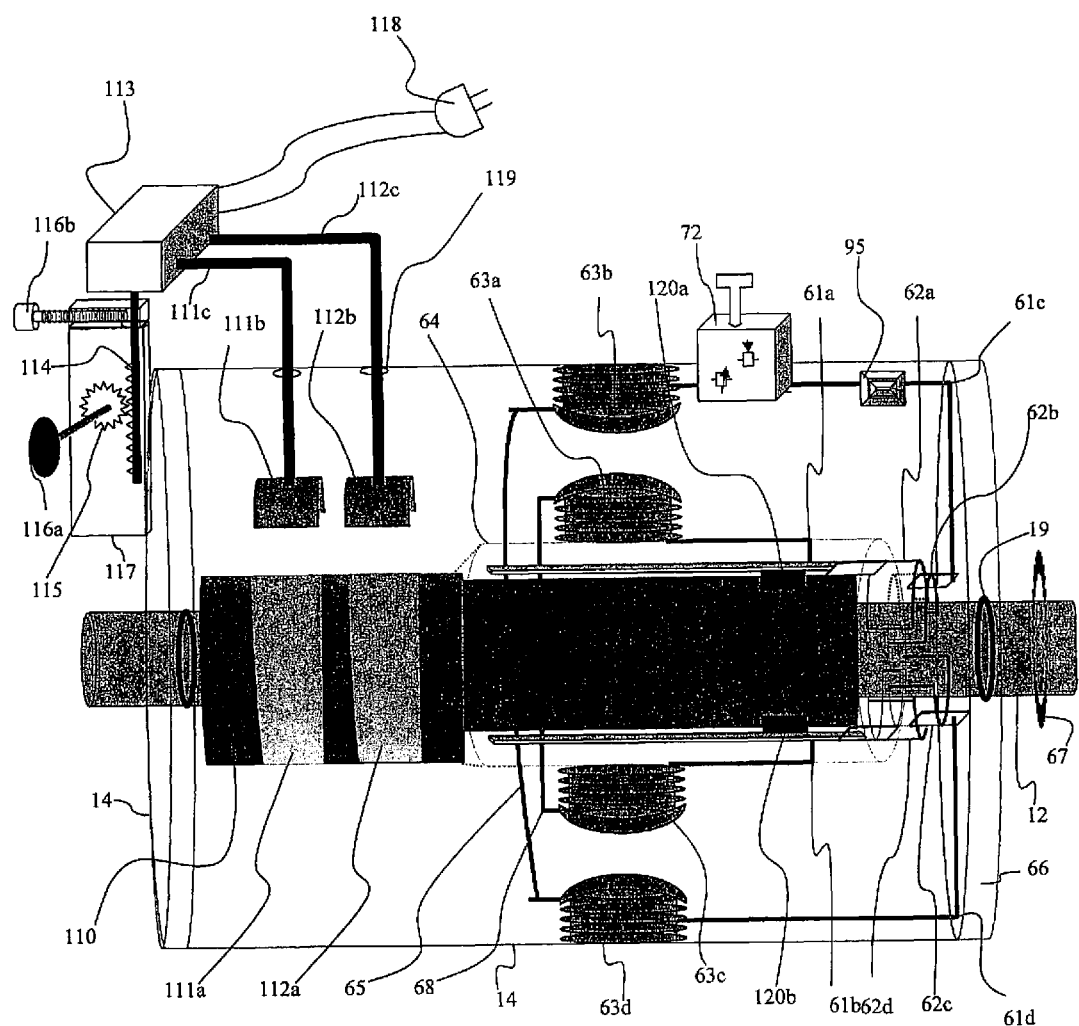
FIG. 21a Shown is the novel Galvanic Cell Motor, or, Battery Motor, which is essentially the replacement of the fuel cells in the Fuel Cell Motor design, with a Galvanic cell or a battery.

Next in FIG. 21a, is shown another Fuel Cell Motor design, but instead of the fuel a cell, a battery or any variant of Galvanic Cell that produces electricity is placed. These Galvanic Cell or battery can be made from the rechargeable variety. The battery (or Galvanic cell), 110, is placed and mounted on top of a output shaft, 12, FIG. 21a. The battery is shown to be cylindrical in shape although can be of any shape and size.

The battery, 110, can be dismounted and mounted easily on the output shaft, 12. The battery, 110, has the current collector plate and current retriever plate, connected to the positive and negative terminals, 120a and 120b, of the battery. The apparatus of the electromagnetic poles, 63a, 63b, 63c, and 63d, the connecting wires, 61a, 61b, 61c, 61d, 65, 68, the commutators, 62a, 62d, the stators, 62b, 62c, the switch, 95, the potentiometer, 72, and the sturdy strong cylindrical encasing, 64, on which the electromagnetic poles rest, as illustrated in FIG. 16, is similarly arranged for the configuration of FIG. 21a.

In addition there is an attached rechargeable unit which articulates to recharge the battery, FIG. 21a. The battery has two sets of circular metallic strips, 111a and 112a, that brings in current to recharge the battery, when the battery is down or uncharged, and without the ability to provide electricity. On the opposite side of these circular metallic strips, 111a and 112a, lies the counterpart of the negative and positive semi circular metallic terminals, 111b and 112b, that articulate with 11a, 112a, to impart electrical charge to the, FIG. 21a. Now, the stationary metallic strips, 111b and 112b, are attached to stiff wiring unit, 111c and 112c, that not only functions to supply electricity to the metallic strips, 111b and 112b, but also participates in lowering the metallic strips, 111b and 112b, onto the negative and positive metallic strips, 111a and 112a, on the battery, FIG. 21a.

The stiff metallic wires, 111c and 112c, is attached to a rechargeable unit, 113, which contains a transformer among other things, FIG. 21a. The battery rechargeable unit, 113, is then connected to the electrical outlet on the wall, 118, or any other sources of electricity output. The rechargeable unit, 118, is attached to a gear box subunit, 117, FIG. 21a. Then the rechargeable unit, 118, is joined to a rack type gear, 114, with linear gear teeths, which articulates with the pinion gear, 115, FIG. 21a. The pinion gear, 115, is joined perpendicularly with a shaft that has a knob, 116a, FIG. 21a.

The rotation and twisting of the knob, 116a, controls the rotation of the pinion gear, 115, and the movement of the rack flat gear, 114, in the up and down position, FIG. 21a. In order to lock and prevent any movement of the entire assembly of the pinion gear, 115, the rack flat gear, 114, the rechargeable unit, 113, the stiff wires, 111c and 112c, and the metallic strip, 111b and 112b, a controller screw, 116b, which when rotated can pin the rack flat gear, 114, against the wall of the gear box, 117, FIG. 21a. And the unscrewing of the screw entity, 116b, releases and allows the aforementioned assembly to move the up and down, and more importantly, allow the strip, 111b, 112b, and, 111a, 112a, to articulate and come in contact with each other, FIG. 21a. Note that the gear box, 117, is joined to the stationary cylindrical encasing of the battery motor, FIG. 21a. Note the holes, 119, on the stationary cylindrical encasing wall to allow the stiff wires, 111b and 112b, to pass into the motor chamber, FIG. 21a.

To recharge the Galvanic Cell or the battery, 110, the knob, 116a, is rotated to make the pinion gear, 115, move the rack flat gear, 114, downward, which lowers the rechargeable unit, 113, together with the stiff current carrying wires, 111c and 112c, and the metallic strip, 111b and 112b, to articulate with the metallic strips, 111a and 112b, FIG. 21a. Since the rechargeable unit, 113, is plugged into the wall outlet, whence, the electricity from the wall enters from the two articulating strips, 111a, 111b and 112a, 112b, into the recharging battery, 110, FIG. 21a.

Once the battery has been fully recharged as indicated (electronically) on the recharging unit, 113, then the knob, 116a, is turned such that the pinion gear, 115, rotates the rack flat gear, 114, upwards, lifting the rechargeable unit, 113, together with the stiff wires, 111c, 112c, and the metallic strip, 111b, 112b, away from the battery, 110, stopping the recharging process, then, the screw, 116b, is turned such that the rack gear shaft, 114, is locked in the stationary position, FIG. 21a. The locking mechanism of the aforementioned apparatus, prevents the strips 111b, 112b, from falling onto the battery, 110, especially during the operational phase of the battery motor.

Once the battery has been fully charged then the main switch, 95, can be turned to the on, position, FIG. 21a. Now electric current from the battery, 110, flows in the following way: from conductor and attachment, 120a, the electric current goes into collector plate then into the wire, 61a, then, into the commutator, 62a, and the electromagnetic pole, 63a, then, into the wire, 68, then, into the electromagnetic pole, 63c, then, into the current retriever plate and finally enters as the returning current into the retrieving terminal of the battery, 120b; at the same time the electric current goes from the commutator, 62a, into the stator, 62b, via the electrical brushes, into the stator wire, 61c, through the switch, 95, into the potentiometer, 72, then, into the stator electromagnetic pole, 63b, then, into the stator wire, 65, then, into the electromagnetic pole, 63d, then into the stator wire, 61d, through the stator, 62c, back into the commutator, 62d, and enters into the current retriever plate to finally return the current to the retrieving terminal of the battery, 120b, FIG. 21a.

As mentioned before, the physics of electromagnetism is readily apparent wherein, the electromagnetic poles, 63a and 63b, 63a and 63d, 63c and 63d, 63c, and 63b, electromagnetically oppose each other with a given force causing the shaft, 12, and the attached battery, 110, to rotate on its axis, FIG. 21a. The potentiometer, 72, regulates the amount of current going into the electromagnetic poles, 63, and thus regulates the rotational speed of the shaft, 12, from a given maximum to zero, FIG. 21a. So, long as power and electricity is provided by the battery, the battery motor will function and be operational, but once the battery is discharged fully, it can be re-charged again, for continued battery motor function by the mechanism illustrated before, FIG. 21a. The switch, 95, should never be turned on when the battery is charging as it will break the battery motor apart.

The primary advantage in this design of the battery motor, is that the reactants inside the battery or any Galvanic cell, reacts at much faster rates because the battery experiences physical rotational motion with the bonded output shaft, 12, which in turn is undergoing the primary rotational motion; thus, rendering increased power output and a faster rotational motion for the output shaft of this novel motor device. Note that with robust power output in this design of battery motor, the accompanying battery would discharge sooner than a stationary battery coupled to a regular motor. But importantly so, there is conservation of space, (or a space saving measure, for applications wherein a compact motor design is so desired), if the battery and motor are combined in this embodiment of the battery motor according to the present disclosure, as opposed to the stationary battery supplying power to an operational motor.

Figure 21B:
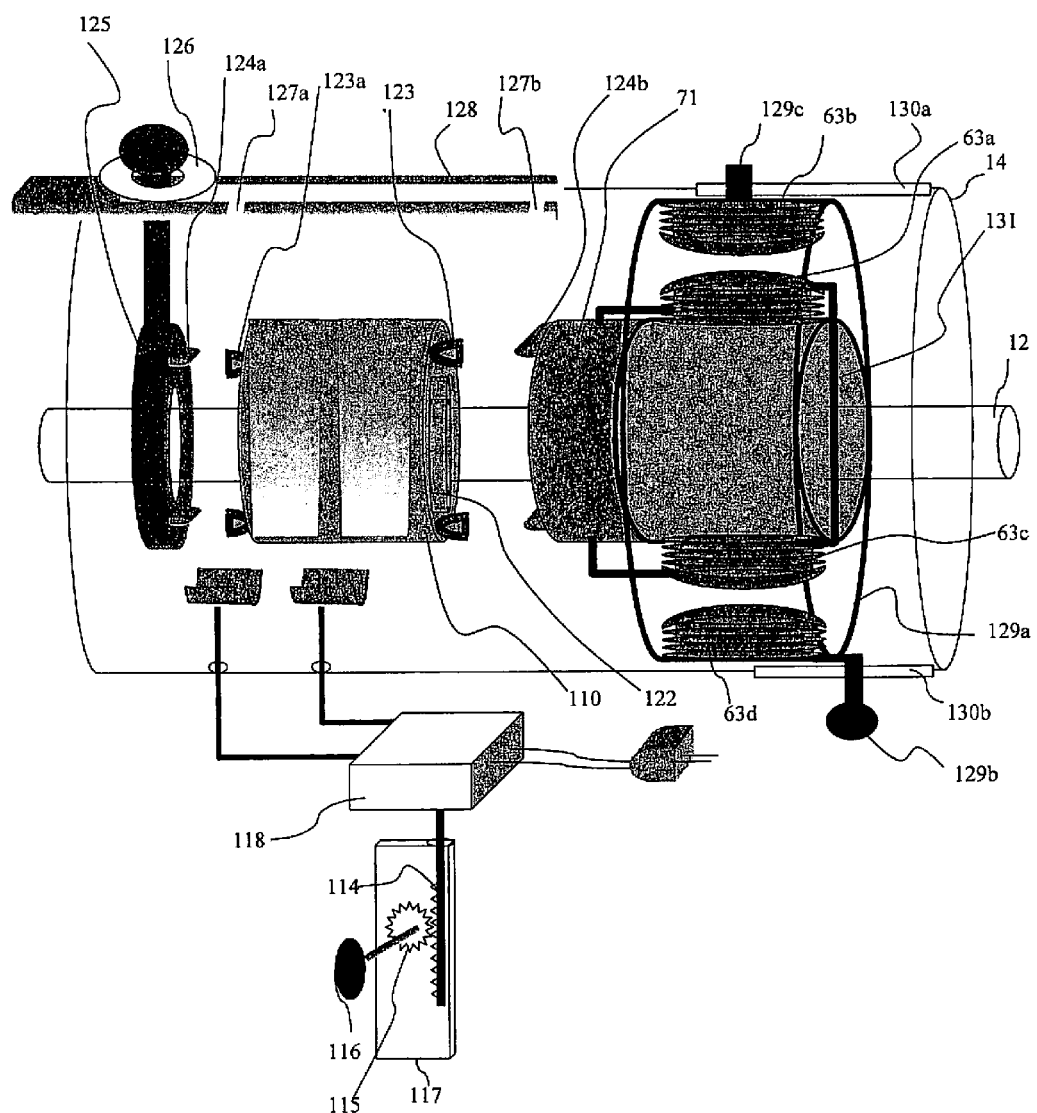
FIG. 21b Shown is an Inverter, (or, time delay relay), that lie in between the rotating battery and the electromagnetic pole of the armature, making for a brushless battery motor design. Also shown is the mechanism by which the stator electromagnetic poles can be made to slide over the armature electromagnetic poles, without any contacting points, so that the rotational speed of the output shaft is controlled.

Next in FIG. 21b, the brushless battery motor, is so described. In general the motor design is the same as the one illustrated in FIG. 15, in which case, there is battery or any Galvanic Cell, 110, in place of the hydrogen fuel cell bonded onto the central output shaft, 12, as in FIG. 21b. Herein, the battery, 110, is attached to an Inverter, 71, and the inverter takes the DC current from the battery and inputs an AC current into the electromagnetic poles, of FIG. 21b, thus causing the rotational motion of the output shaft, 12. Note there is no need for the commutator and the stator, in this the embodiment of the brushless battery motor, FIG. 21b.

In FIG. 21b, the mechanism to control the flow of current from the battery and therefore the rotational speed of the output shaft is so described. Shown in FIG. 21b, is a solid disc, 125, with hole in the center which circumscribes the central shaft, 12, and does not articulate with the shaft, 12. This disc, 125, has a handle that protrudes out of the groove, 128, on the cylindrical encasing, 14, and a washer, 126, articulates with the handle and encasing, 14, to hold the disc, 128, in stabilized stationary position around the output shaft, 12, FIG. 21b. The disc has on its circular surface a male type lock protruding entity, 124a, which locks into the female type lock entity, 123a, on the battery, 110, residing on the central shaft, 12, FIG. 21b. On the other side of the battery is another female type locking entity, 123b, which locks on to the male type locking entity, 124b, on the Inverter, 71, FIG. 21b. The battery, 110, can be made to slide along the output shaft, 12, however, the Inverter, 71, is permanently affixed to the output shaft, 12, FIG. 21b.

Once the battery has been discharged, in the embodiment of the brushless battery motor, will stop working and the battery, 110, needs to be de-coupled and disconnected from the inverter, 71, in order to charge the battery again and then reconnect it with the inverter, 71, FIG. 21b. The solid disc, 125, is brought near the battery and handle is manipulated such that the male and female locking entities lock and the battery, 110, is twisted off the inverter, 71, FIG. 21b.

The battery, 110, is brought near the charging unit and then re-charged. The battery then is brought near and articulated with the Inverter, 71, the male and female parts are twisted onto each other into a locked position and battery and inverter are then one unit again. But if the battery and inverter come in contact then the power from the battery goes to the inverter and electromagnetic poles and the rotational motion of the brushless battery motor will be completely un-impeded. In order to control the rotational motion of the output shaft, 12, there are two mechanisms that exert such reliable controls on the motor.

First, by way of moving the stationary electromagnet poles, 63b, 63d, attached to the sliding cylindrical encasing entity, 129a, in and out of the fixed armature electromagnetic pole, 63a, 63c, region, FIG. 21b. The cylindrical encasing entity, 129a, has two protruding knobs, 129b, 129c, that are attached to the encasing entity, 129a, and comes out the holes, 130a and 130b, on the stationary cylindrical entity, 14, FIG. 21b. The movement of the knob, 129b, and the attached cylindrical encasing, 129a, causes the joined electromagnet, 63d, 63b, to move accordingly, away or toward the electromagnet poles, 63a, 63c, FIG. 21b.

When the electromagnet poles, 63b, 63d, come in close proximity to the other poles, 63a, 63c, then the rotational motion of the poles, 63a, 63c, occurs if the AC electrical current is available into the poles, 63a, 63c, from the inverter, 71, FIG. 21b. Similarly, when the poles, 63b, 63d, are taken away from the poles, 63a, 63c, by shifting of the cylindrical encasing, 129a, (parallel movement with respect to the larger cylindrical encasing, 14) and knobs, 129b, 129c, then the electromagnetic interaction between the poles 63b, 63d, and 63a, 63c, is minimized due to an unreasonable distance between them, leading to minimal to zero rotational force on the poles, 63a, 63c, the output shaft, 12, and the attached battery, 110, and inverter, 71, FIG. 21b.

It is important that when the battery, 110, is being charged and/or the locking disc, 125, is articulating with the sliding (along the shaft, 12) battery, 110, that the electromagnetic poles, 63b, 63d, is far away and that no electromagnetic reaction happens between the opposite poles to yield into a rotational motion of the output shaft. Once the battery, 110, is fully charged and reattached to the inverter, 71, by the solid disc, 125, then only the poles, 63b, 63d, are translated back into close proximity of the poles, 63a, 63c, for rotational motion of the output shaft, 12, to occur.

Second, the cylindrical entity, 131, can be housed by a number of electrical resistors of ever increasing resistance that impedes electrical flow of currents from the inverter, 71, to the poles, 63a, 63c, FIG. 21b. The resistors are connected to a microprocessor which allocates input current from the inverter into the higher and lower resistance electrical resistor. The microprocessor is controlled by the infrared, IR, or radio wave, RD, remote control mechanism. So the entity, 131, is a remote control unit that impedes or does not impede the flow of current from the inverter, 71, going into the brushless battery motor poles, 63a, 63c, FIG. 21b.

This regulation of current flow by remote control mechanism leads from zero current to some maximum amount, which translates into the rotational motion of the output shaft, 12, from zero to a maximum rotational RPM. Note that this potentiometer, 131, can be remotely controlled and it also rotates with the output shaft, 12.

Figure 21C:
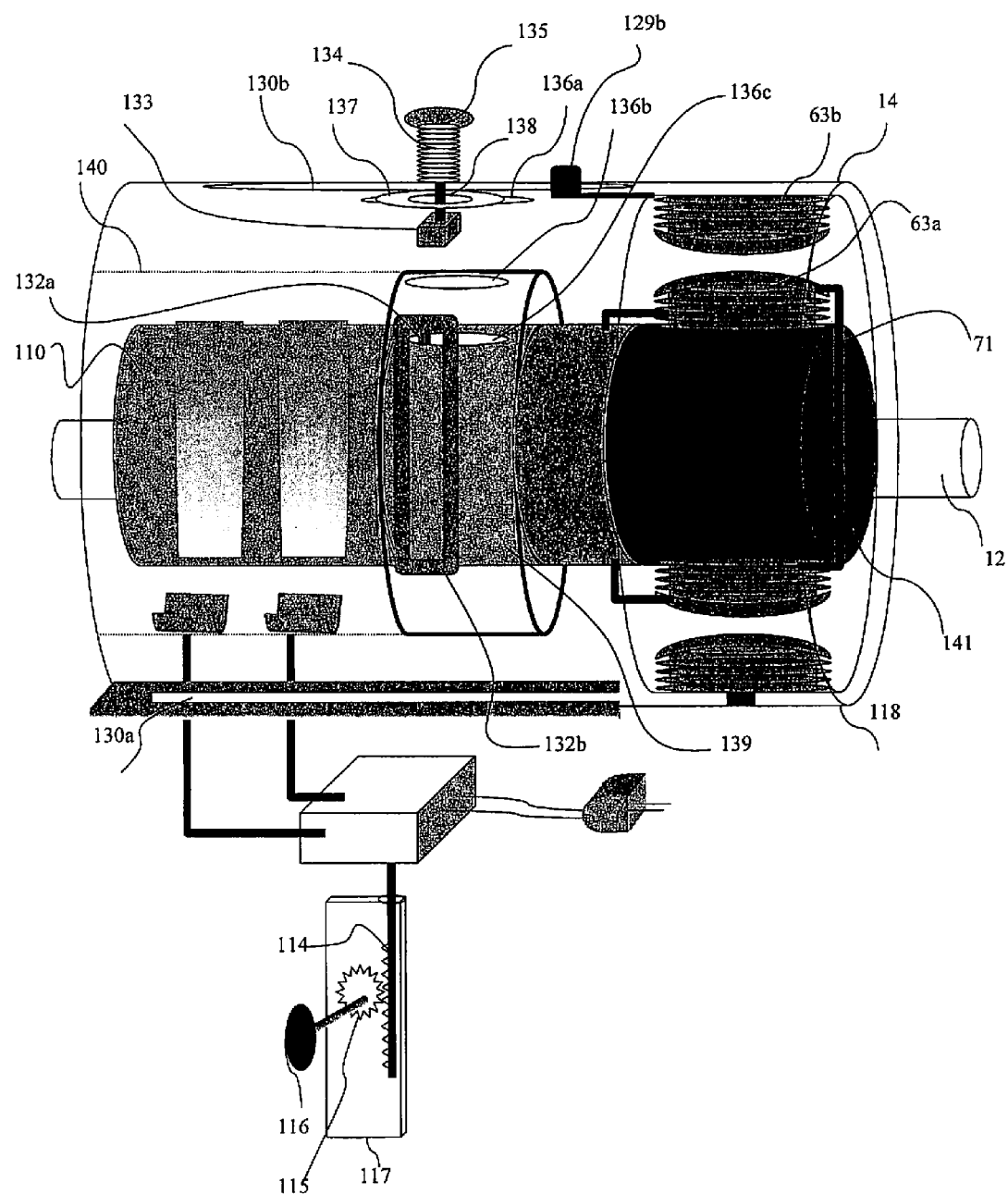
FIG. 21c Illustrated are two mechanisms to control the rotational speed of the output shaft; first, is an electronic remote control mechanism, and second, is a mechanical apparatus consisting of magnets, both of which partially attach onto the output shaft of the battery motor.

Lastly, in FIG. 21c, there is another mechanical means to control the resistance and flow of current from the battery into the inverter, 71. Herein, a rotating cylindrical shaped potentiometer, 139, mounted on the output shaft, 12, in between the battery, 112, and the inverter, 71, has a magnetically controlled dial, 132a, 132b, that goes into through the hole, 136c, FIG. 21c. The dial, 132a, has cylindrical surface covered with a permanent magnet and that it rotates with the potentiometer, 139, FIG. 21c. Now there is another stationary cylindrical encasing, 140, attached to the bigger stationary encasing, 14, FIG. 21c.

The cylindrical encasing, 140, has a slit like hole, 136b, through which another permanent magnet, 133, can be made to enter to articulate with the cylindrical permanent magnet, 132b, without each of them touching each other, FIG. 21c. The permanent magnet, 133, is attached to a shaft, 138, attached to a knob, 135, and the shaft, 138, has a compression spring, 134, articulation, FIG. 21c. There is also a slit like hole, 136a, on the cylindrical encasing, 14, and a washer, 137, around the shaft, 138, FIG. 21c.

When the motor output shaft, 12, is rotating and to decrease or increase the rotational motion would entail decreasing or increasing the flow of currents into the poles, 63a, 63c, through the inverter, 71, FIG. 21c. The control of the flow of current into the inverter, 71, and the poles, 63a, 63c, is controlled by the rotating potentiometer, 139, between the battery, 110, and the inverter, 71, FIG. 71. Since the potentiometer dial, 132a, 132b, is magnetic the articulation with another magnet namely, 133, when brought in close proximity to the dial magnets, 132a, 132b, yields attractive forces between, magnets, 132a, 132b, and 133, FIG. 21c.

The magnets, 133, are brought in close proximity to magnet, 132a, 132b, by pushing on the knob, 135, and overcoming the compression spring, 134, force, FIG. 21c. The knob, 135, pressed against the washer, 137, and the hole, 136a, is then pushed forwards (or backwards, as the case might be), which then moves the cylindrical piece of permanent dial magnet, 132a, 132b, on the rotating potentiometer, 139, forwards (or backwards, as the case might be), FIG. 21c. The dial, 132a, 132b, movements as part of the potentiometer, 139, increases the resistance and impedance of current flow from the battery, 110, to the inverter, 71, and to the poles, 63a, 63c, FIG. 21c. Again, low resistance allows maximal current into the poles and high resistance allows low current to flow into the poles.

The maximal current flow allows some maximal rotational motion of the output shaft, 12, and the low current yields low RPM for the output shaft, 12. In FIG. 21c, the fixed cylindrical unit, 141, contains a remote controlled switch to allow the passage of current from the inverter, 71, into the poles, 63a, 63c, FIG. 21c. The rest of the operational functions in the design of FIG. 21c, is the same as the one illustrated in FIG. 21b. Again, there is the battery charging unit, there is the electromagnet pole, 63b, 63d, sliding unit all in an effort to control the rotational function of the brushless battery motor.

It will be appreciated that variations of the above-disclosed and other features and functions, or alternatives thereof, may be desirably combined into many other different fuel cell motors, fuel cell systems, fuel cell applications, or combinations thereof. Also that various presently unforeseen or unanticipated alternatives, modifications, variations or improvements therein may be subsequently made by those skilled in the art which are also intended to be encompassed by one or more of the following claims.

What is claimed:
1. A rotating fuel cell system comprising:
a fuel cell motor;
a rotational shaft having a plurality of conduit components extending therethrough for receiving hydrogen and oxygen molecules, the rotational shaft in operable communication with the fuel cell motor;

a plurality of rotational fuel cells attached to the rotational shaft for generating electricity;

a plurality of armature poles positioned in a vicinity of the plurality of fuel cells and attached to the rotational shaft; and a plurality of stator poles positioned in a vicinity of the plurality of fuel cells and configured to be stationary;

wherein the hydrogen and oxygen molecules are affected by movement of the plurality of rotational fuel cells, thus augmenting a reaction process and increasing electric current production to yield higher torque generation onto the rotational shaft, and wherein the plurality of conduit components comprise a plurality of pairs of conduit components, wherein each pair of conduit components is symmetrical about a horizontal axis of the rotational shaft.

2. The rotating fuel cell system according to claim 1, further comprising:

a hydrogen gas tank container having a hydrogen valve for manipulating the hydrogen molecules, the hydrogen molecules being propelled via a plurality of spiked twisting structures positioned within at least one conduit of the plurality of conduits;

an oxygen gas tank container having an oxygen valve for manipulating the oxygen molecules;

at least one current carrying plate for collecting current generated from the interaction of hydrogen and oxygen molecules within the rotating fuel cell system; and a plurality of magnets positioned in a vicinity of the plurality of fuel cells, the plurality of armature poles, and the plurality of stator poles, the plurality of magnets creating repellent magnetic forces with the plurality of armature poles and stator poles.

3. The rotating fuel cell system according to claim 1, wherein at least one fuel cell of the plurality of fuel cells is a discoid-shaped fuel cell composed of an anode end plate, a first hard metal wire for dispensing current, a first porous membrane, an electrolyte proton exchange material, a second porous membrane, a cathode end plate, and a second hard metal wire for accepting current.

4. The rotating fuel cell system according to claim 1, wherein the plurality of conduit components transport hydrogen and oxygen gases and dispense byproducts from at least one fuel cell of the plurality of fuel cells.

5. The rotating fuel cell system according to claim 4, wherein the hydrogen gas is provided by a hydrogen gas tank container via a hydrogen valve; and wherein the oxygen gas is provided by an oxygen gas tank container via an oxygen valve.

6. The rotating fuel cell system according to claim 4, wherein the byproducts are channeled through a vapor containing chamber having at least one turbine blade attached to the rotational shaft to create additional rotational movement.

7. The rotating fuel cell system according to claim 1, wherein the fuel cell motor includes at least one current carrying plate for collecting current generated from the interaction of hydrogen and oxygen gases within the fuel cell motor.

8. The rotating fuel cell system according to claim 1, wherein an electrical system supplies hydrogen and oxygen gases that are channeled through one or more chambers including a plurality of electromagnetic winding poles in magnetic communication with and placed about at least one fuel cell of the plurality of fuel cells.

9. The rotating fuel cell system according to claim 8, wherein at least two of the plurality of electromagnetic winding poles are stationary poles;

and wherein at least two of the plurality of electromagnetic winding poles are free-moving poles.

10. The rotating fuel cell system according to claim 8, wherein the at least one fuel cell is connected to the plurality of electromagnetic winding poles via a parallel circuit configuration.

11. The rotating fuel cell system according to claim 8, wherein the at least one fuel cell is connected to the plurality of electromagnetic winding poles via a series circuit configuration.

12. The rotating fuel cell system according to claim 1, wherein unused hydrogen and oxygen gases received via the plurality of conduit components located within the rotational shaft are recycled back into the fuel cell motor.

13. The rotating fuel cell system according to claim 1, wherein the fuel cell motor includes a heater with a built-in thermostat, the heater configured to provide additional heat to at least one fuel cell of the plurality of fuel cells.

14. The rotating fuel cell system according to claim 1, wherein the plurality of fuel cells are a series of fuel cells horizontally or vertically assembled along a length of the rotational shaft, the series of fuel cells being in operative communication with the plurality of armature poles and stator poles.

15. The rotating fuel cell system according to claim 1, wherein the plurality of fuel cells are arranged in a radial configuration with respect to the rotational shaft, the radial configuration of the plurality of fuel cells being in operative communication with the plurality of armature poles and stator poles.

16. The rotating fuel cell system according to claim 1, wherein a plurality of magnets are positioned adjacent at least one fuel cell of the plurality of fuel cells.

17. The rotating fuel cell system according to claim 1, wherein the fuel cell motor includes at least one inverter for inverting electricity from DC to AC, and vice versa, where the at least one inverter is one of a rotational inverter or a non-rotational inverter.

18. The rotating fuel cell system according to claim 1, wherein the fuel cell motor includes a variable resistor for controlling a speed of rotation of the rotational shaft.

19. The rotating fuel cell system according to claim 1, wherein the fuel cell motor includes a cooling system for reducing electric current impedance.

* * * * *